United States Patent
Sohn et al.

(10) Patent No.: US 11,075,402 B2
(45) Date of Patent: Jul. 27, 2021

(54) POSITIVE ELECTRODE ACTIVE MATERIAL FOR POTASSIUM SECONDARY BATTERY AND POTASSIUM SECONDARY BATTERY CONTAINING SAME

(71) Applicant: INDUSTRY-ACADEMIA COOPERATION GROUP OF SEJONG UNIVERSITY, Seoul (KR)

(72) Inventors: Kee-sun Sohn, Seoul (KR); Un-bea Park, Gwangyang-si (KR)

(73) Assignee: INDUSTRY-ACADEMIA COOPERATION GROUP OF SEJONG UNIVERSITY, Seoul (KR)

(*) Notice: Subject to any disclaimer, the term of this patent is extended or adjusted under 35 U.S.C. 154(b) by 108 days.

(21) Appl. No.: 16/310,849

(22) PCT Filed: Mar. 7, 2018

(86) PCT No.: PCT/KR2018/002700
§ 371 (c)(1),
(2) Date: Dec. 18, 2018

(87) PCT Pub. No.: WO2018/164477
PCT Pub. Date: Sep. 13, 2018

(65) Prior Publication Data
US 2020/0313226 A1  Oct. 1, 2020

(30) Foreign Application Priority Data
Mar. 10, 2017 (KR) .................. 10-2017-0030364
Dec. 28, 2017 (KR) .................. 10-2017-0182017

(51) Int. Cl.
*H01M 10/054* (2010.01)
*H01M 4/134* (2010.01)
*H01M 4/02* (2006.01)

(52) U.S. Cl.
CPC ......... *H01M 10/054* (2013.01); *H01M 4/134* (2013.01); *C01P 2002/74* (2013.01); *H01M 2004/028* (2013.01)

(58) Field of Classification Search
CPC ............... H01M 10/054; H01M 4/134; H01M 2004/028; H01M 4/1397; H01M 4/5825; C01P 2002/74; C01B 25/42; Y02E 60/10
See application file for complete search history.

(56) References Cited

U.S. PATENT DOCUMENTS 10,818,967 B2 * 10/2020 Kaga ..................... C01D 15/00
2012/0301787 A1 * 11/2012 Yamamura .......... H01M 4/5825
429/231.5

FOREIGN PATENT DOCUMENTS

| JP | 2016-504257 | 2/2016 |
| KR | 10-2011-0120868 | 11/2011 |
| KR | 10-2017-0009371 | 1/2017 |

OTHER PUBLICATIONS

L. Benhamada et al., "Structure of KVP2O7", Acta Cryst., 1991, C47, pp. 424-425. (Year: 1991).*

(Continued)

*Primary Examiner* — Jayne L Mershon
(74) *Attorney, Agent, or Firm* — Lex IP Meister, PLLC

(57) ABSTRACT

The present invention relates to a positive electrode active material for a potassium secondary battery, the positive electrode active material according to the present invention is a crystalline material comprising: K; a transition metal; P; and O, and comprises, as a main image, an image indicating a diffraction peak having a relative intensity of 5% or more in a range of Bragg angles (2θ) of a X-ray diffraction pattern of 14.7° to 15.7°, 22.1° to 23.1°, 25.5° to 26.5°, and 29.7° to 30.8°, when the relative intensity of the diffraction peak (Continued)

having the highest intensity is taken as 100% in the powder X-ray diffraction pattern of the material.

10 Claims, 24 Drawing Sheets

(56) References Cited

OTHER PUBLICATIONS

J. Han et al., "Investigation of K3V2(PO4)3/C Nanocomposites as High-potential Cathode Materials for Potassium-ion Batteries", Chem. Comm., Jan. 13, 2017, vol. 53, pp. 1805-1808.
L. Benhamada et al., "Structure of KVP2O7", Acta Cryst., 1991, C47, pp. 424-425.
W. B. Park et al., "KVP2O7 as a Robust High-Energy Cathode for Potassium-Ion Batteries: Pinpointed by a Full Screening of the inorganic Registry under Specific Search Conditions", Advanced Energy Materials, 2017, 1703099, inner pp. 1-12, Publication date Jan. 19, 2018.

\* cited by examiner

[FIG.1]
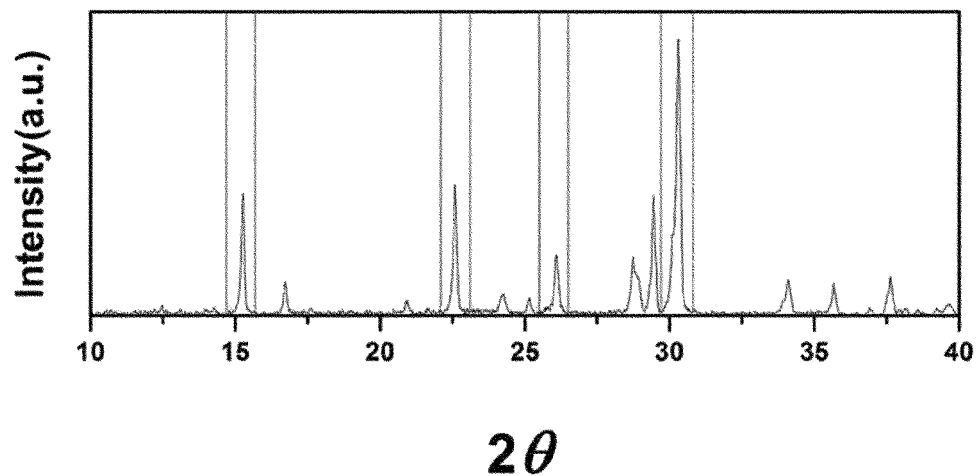

[FIG.2]
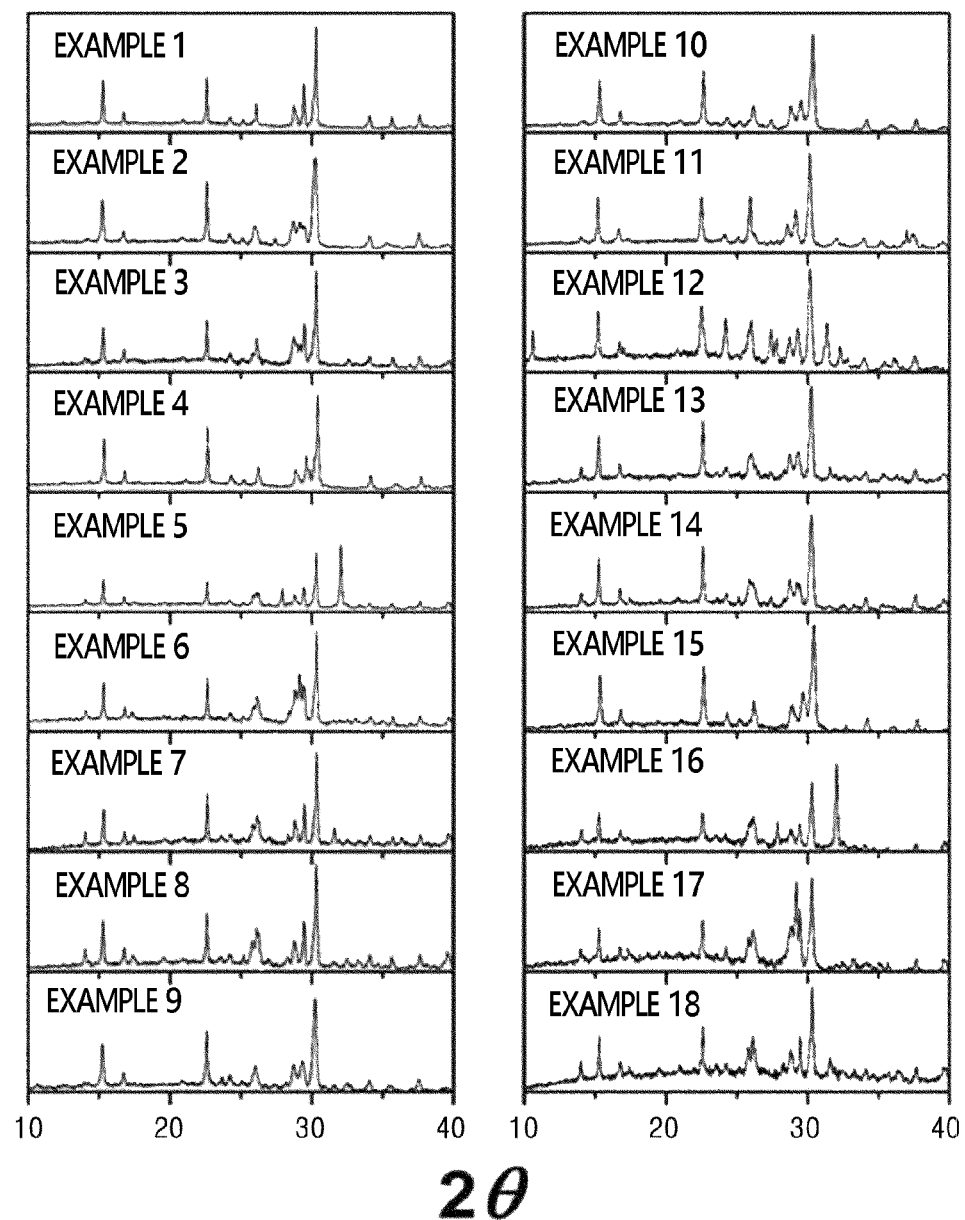

[FIG.3]
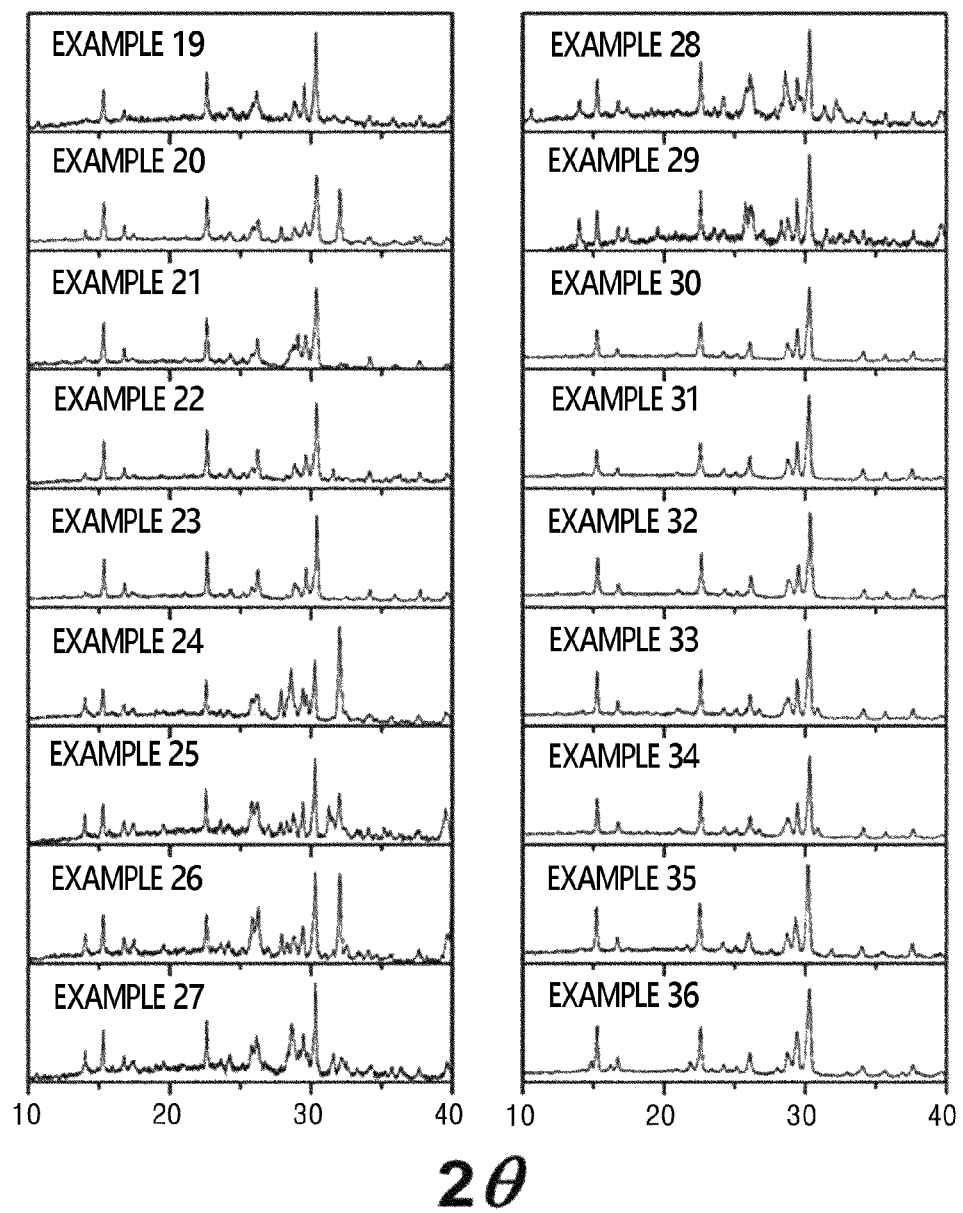

[FIG.4]
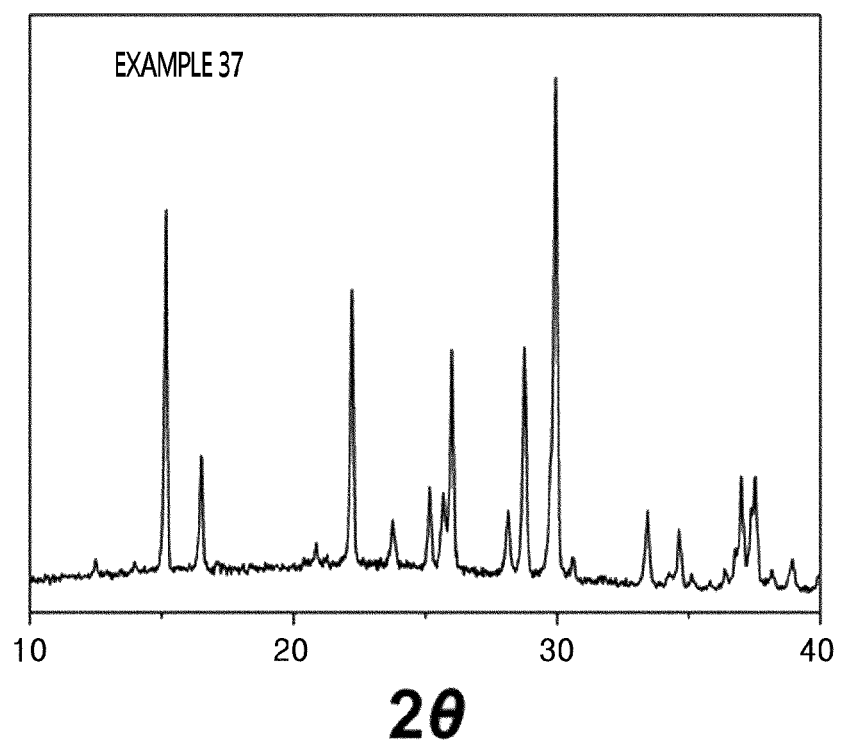

[FIG.5]
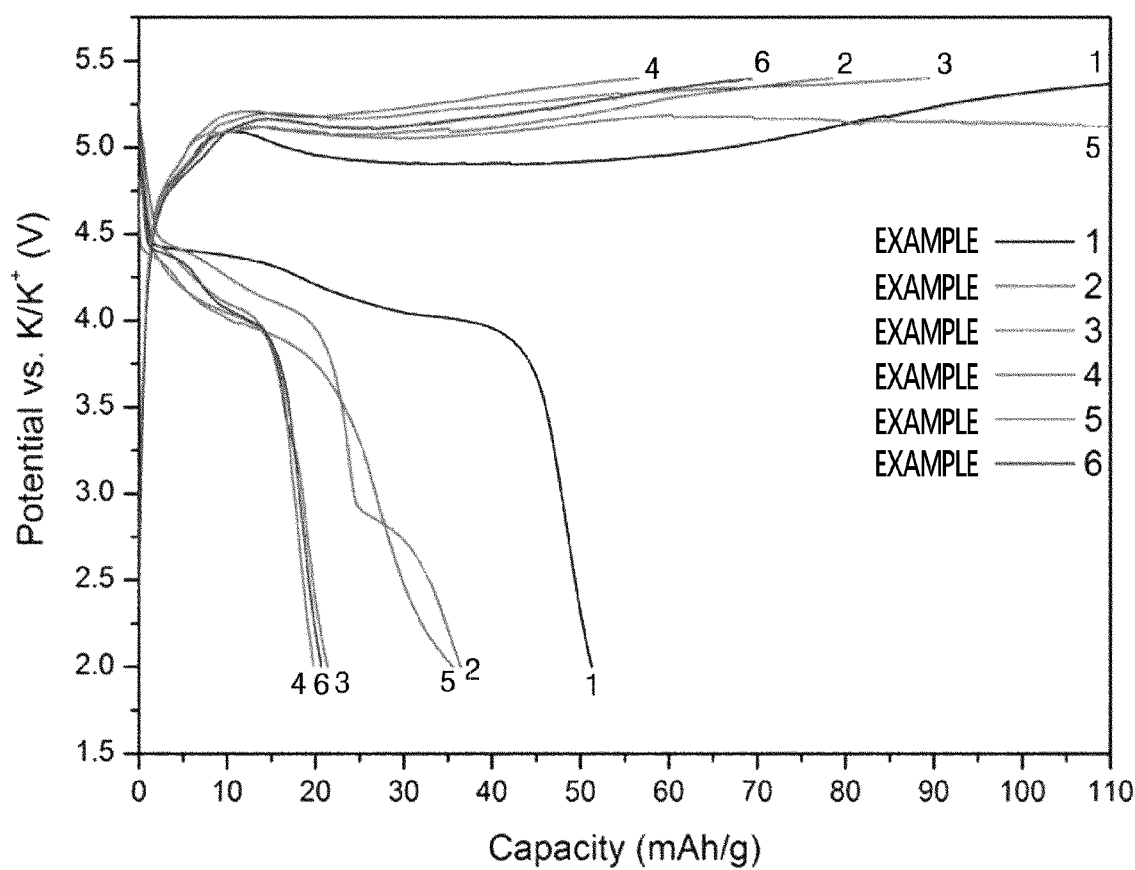

[FIG.6]
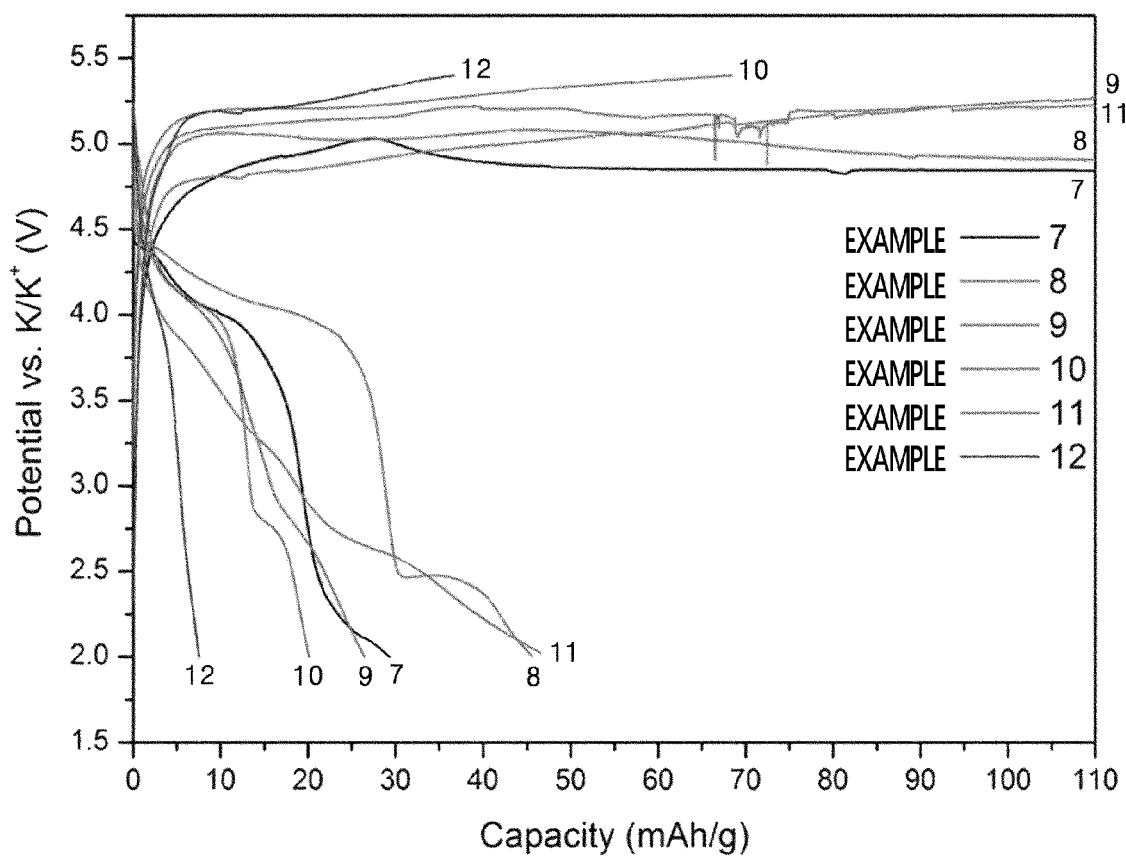

[FIG.7]
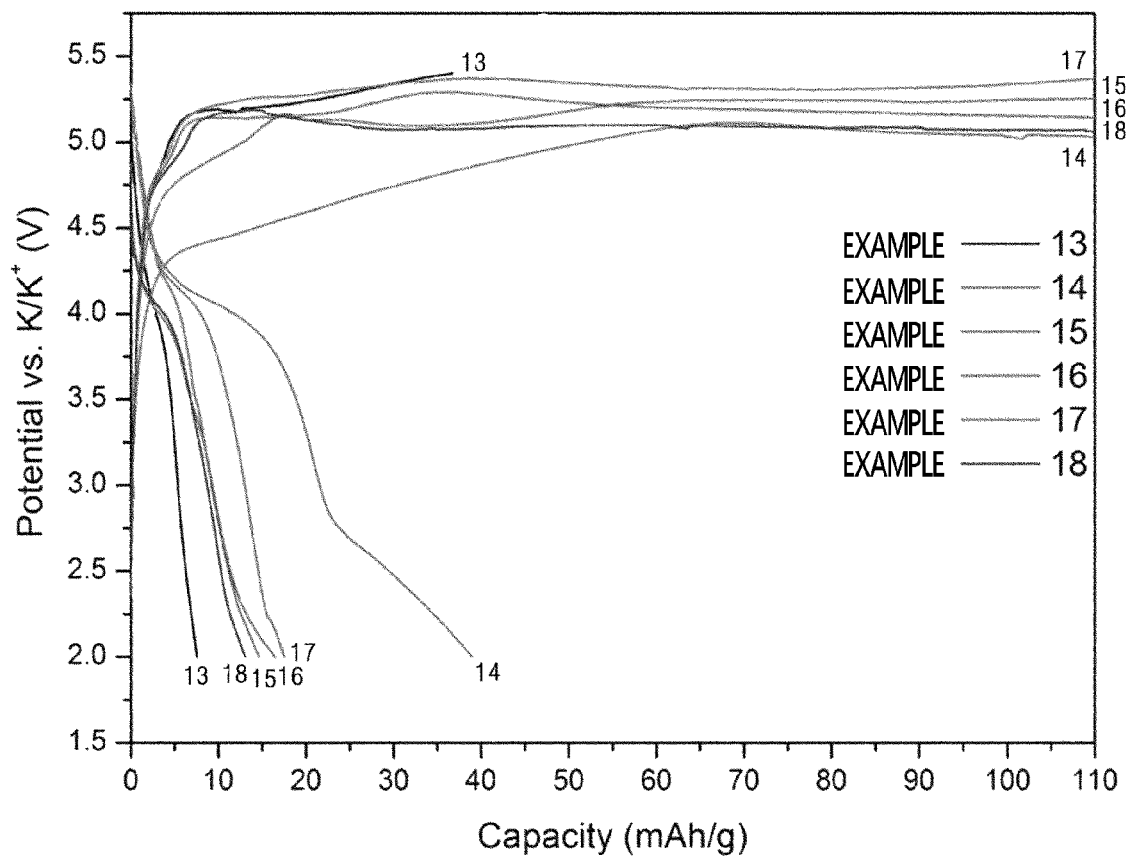

[FIG.8]
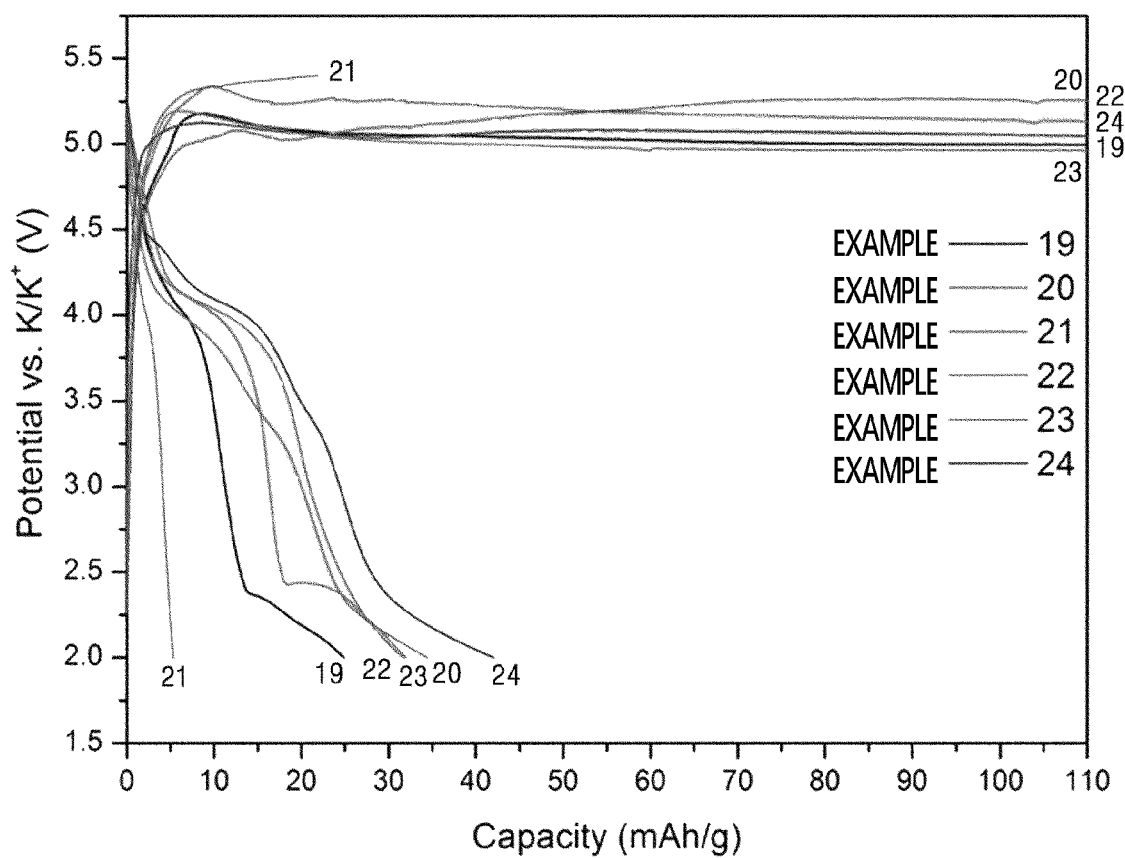

[FIG.9]
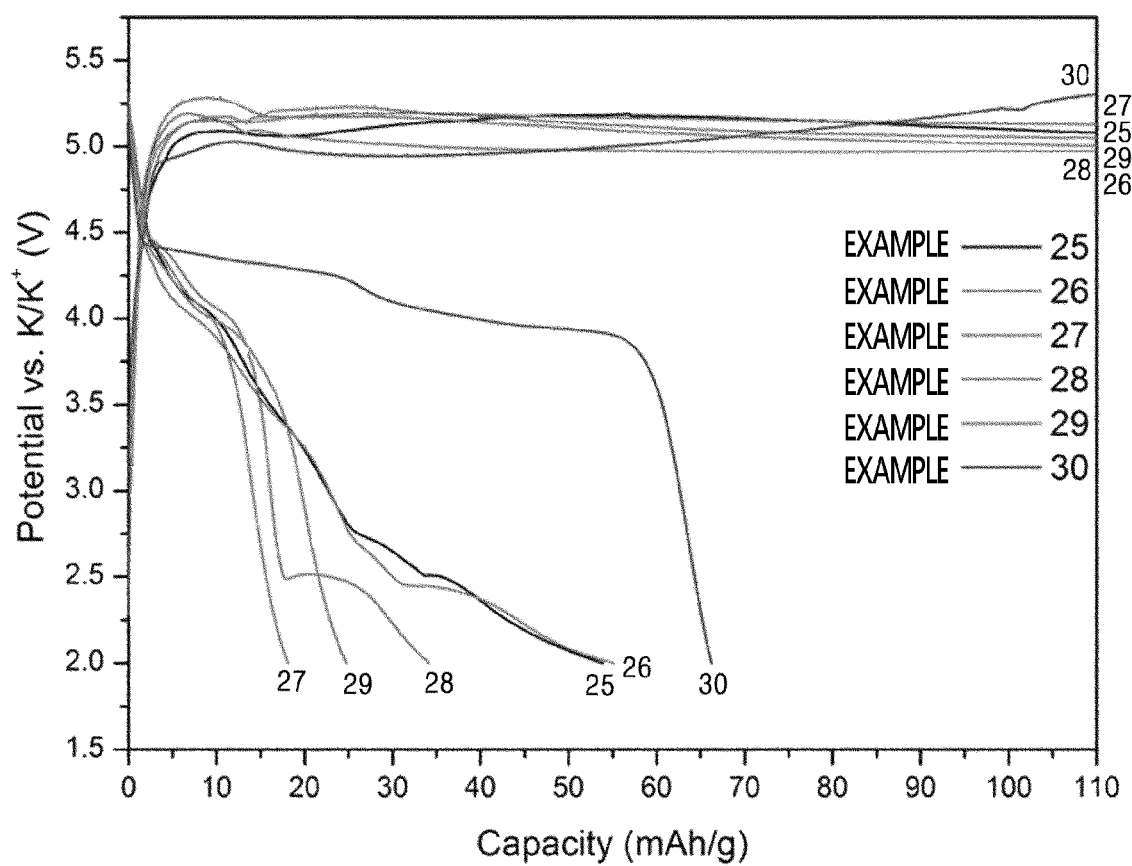

[FIG.10]
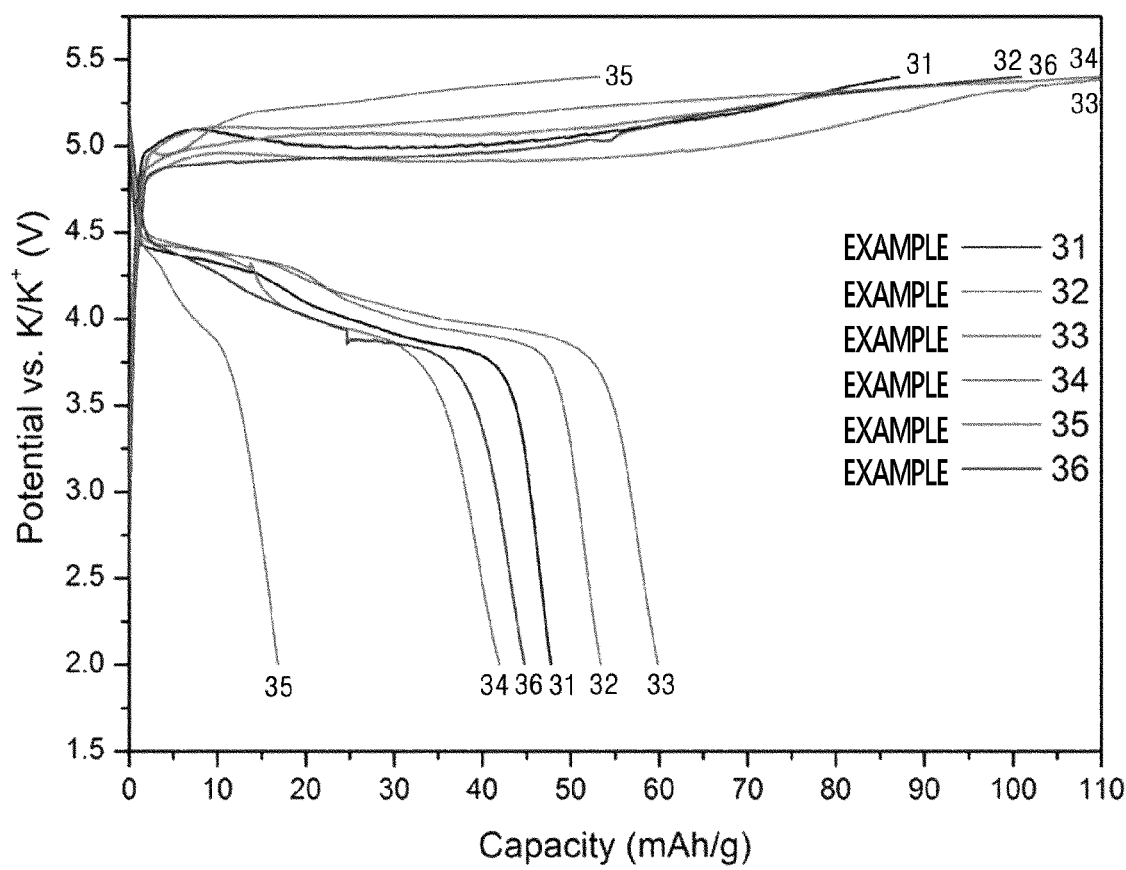

[FIG.11]
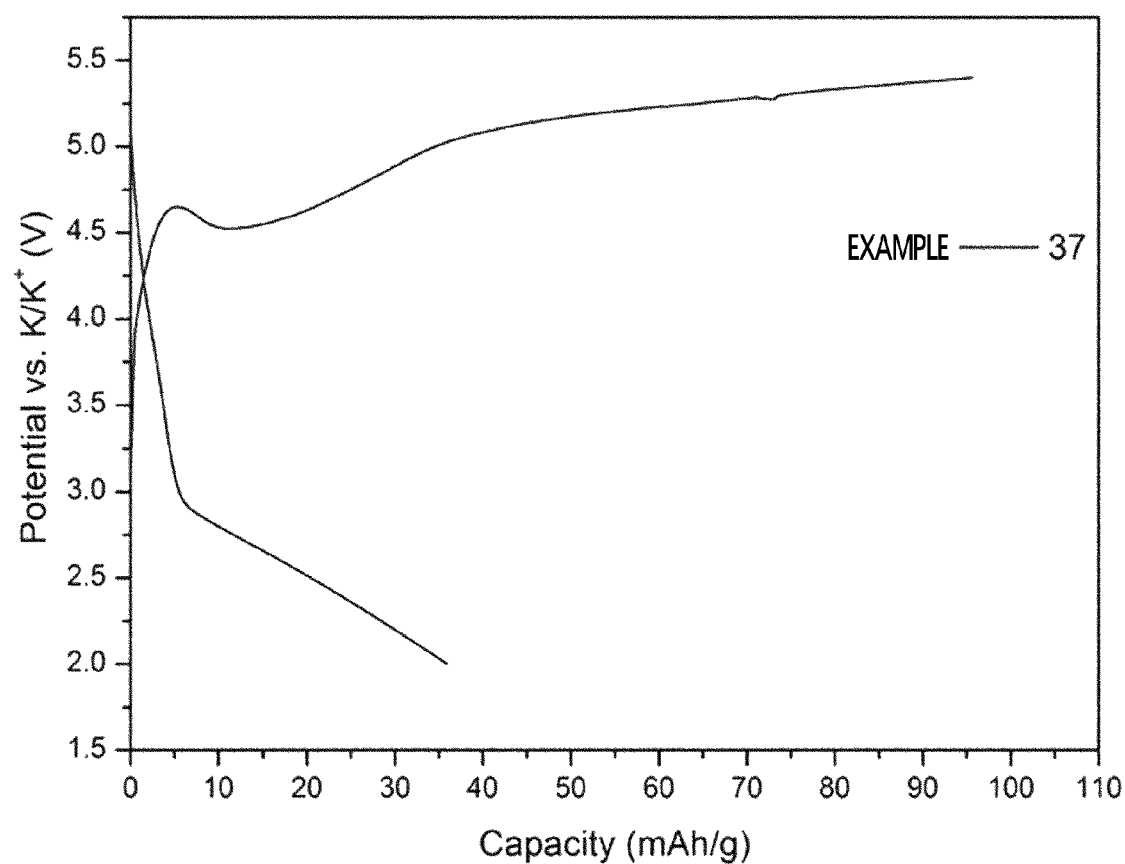

[FIG.12]
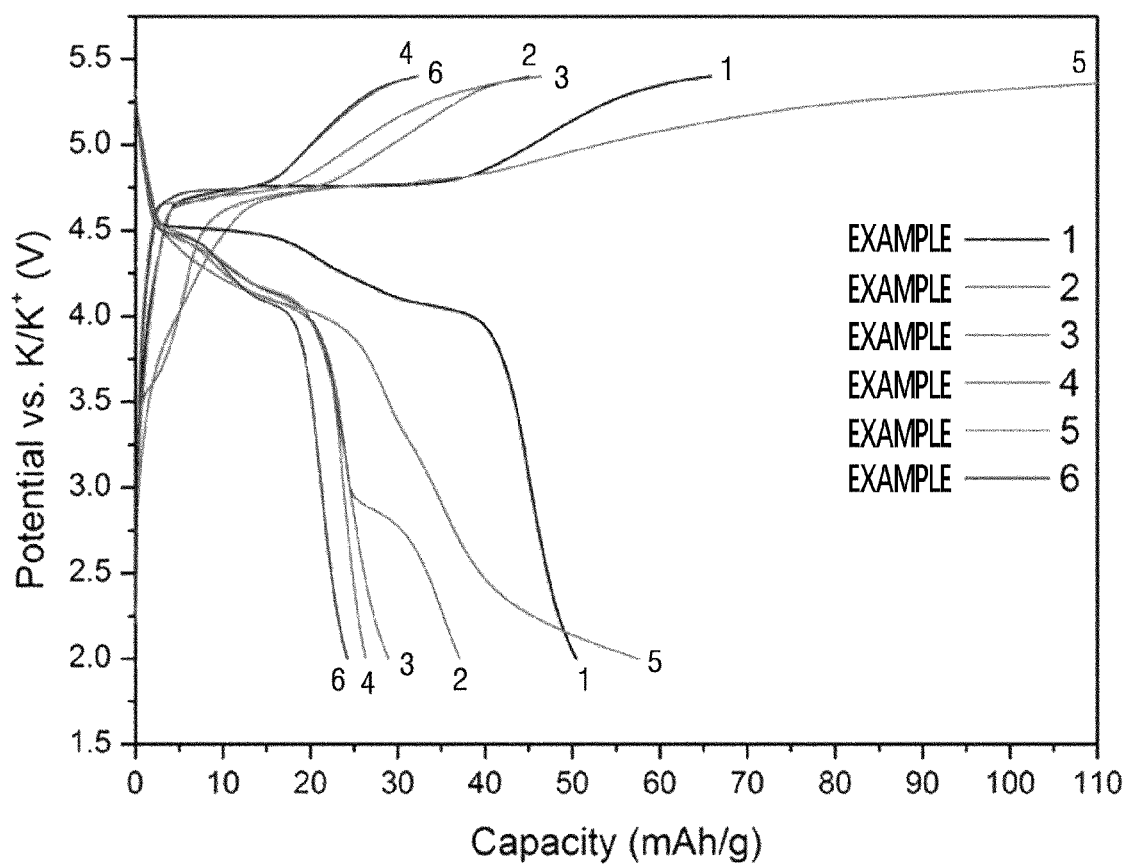

[FIG.13]
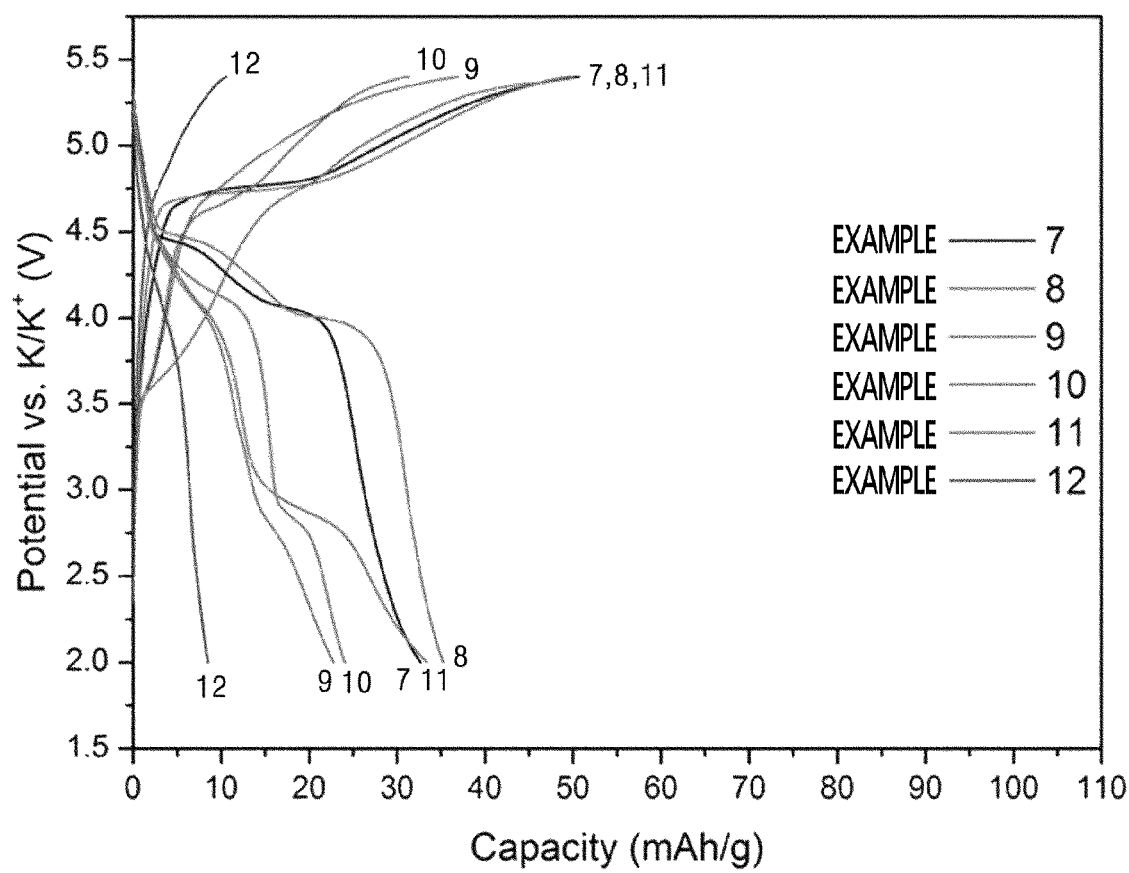

[FIG.14]
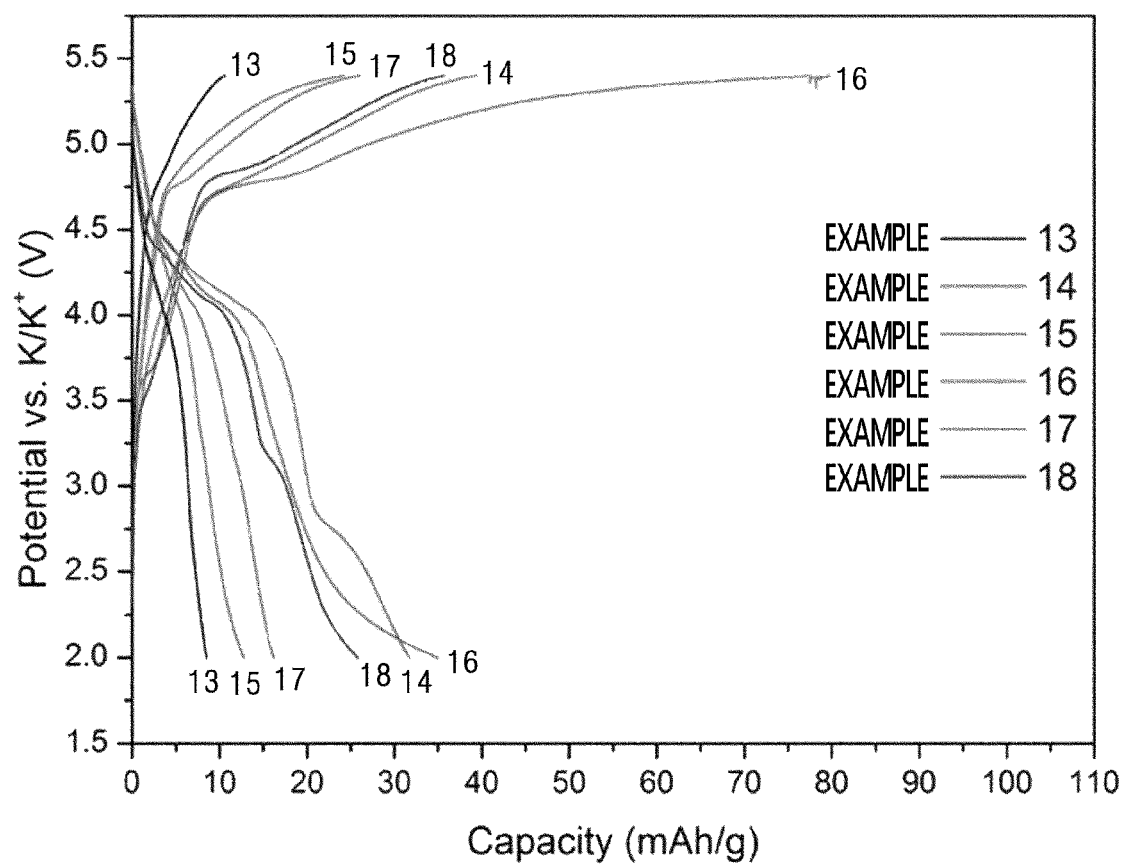

[FIG.15]
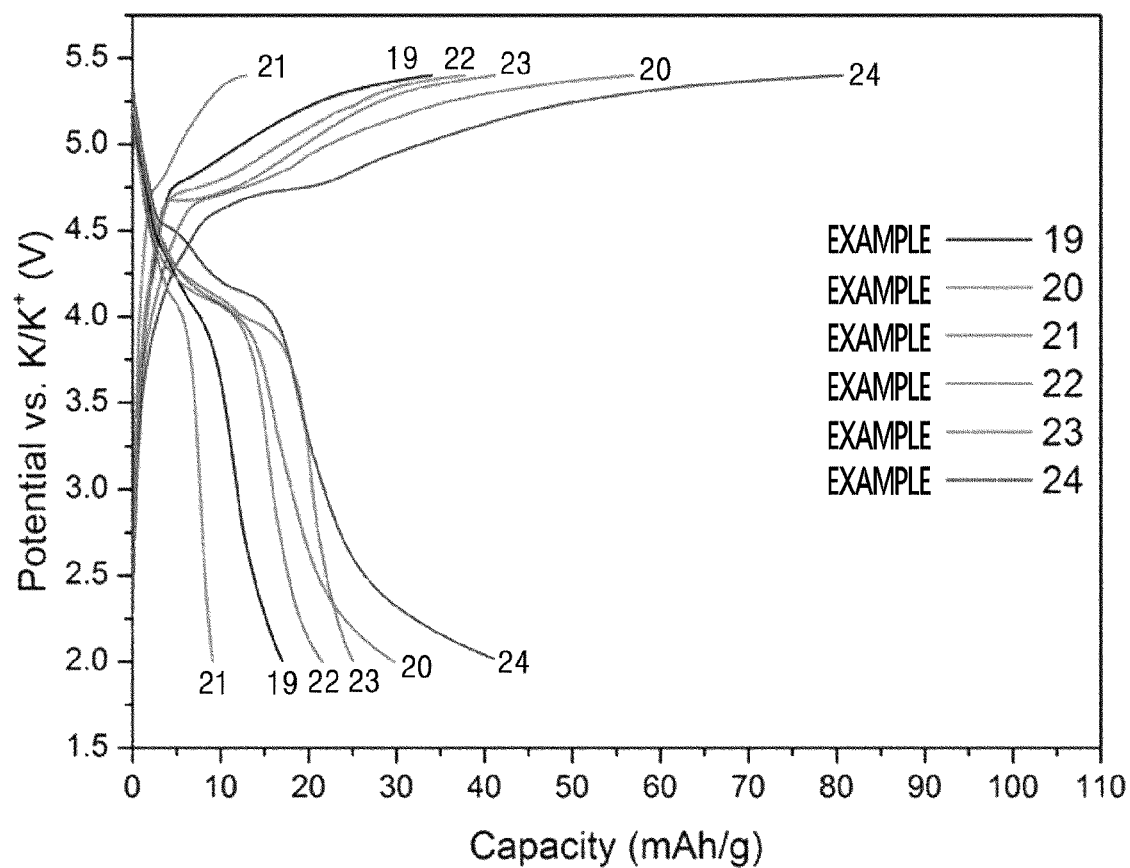

[FIG.16]
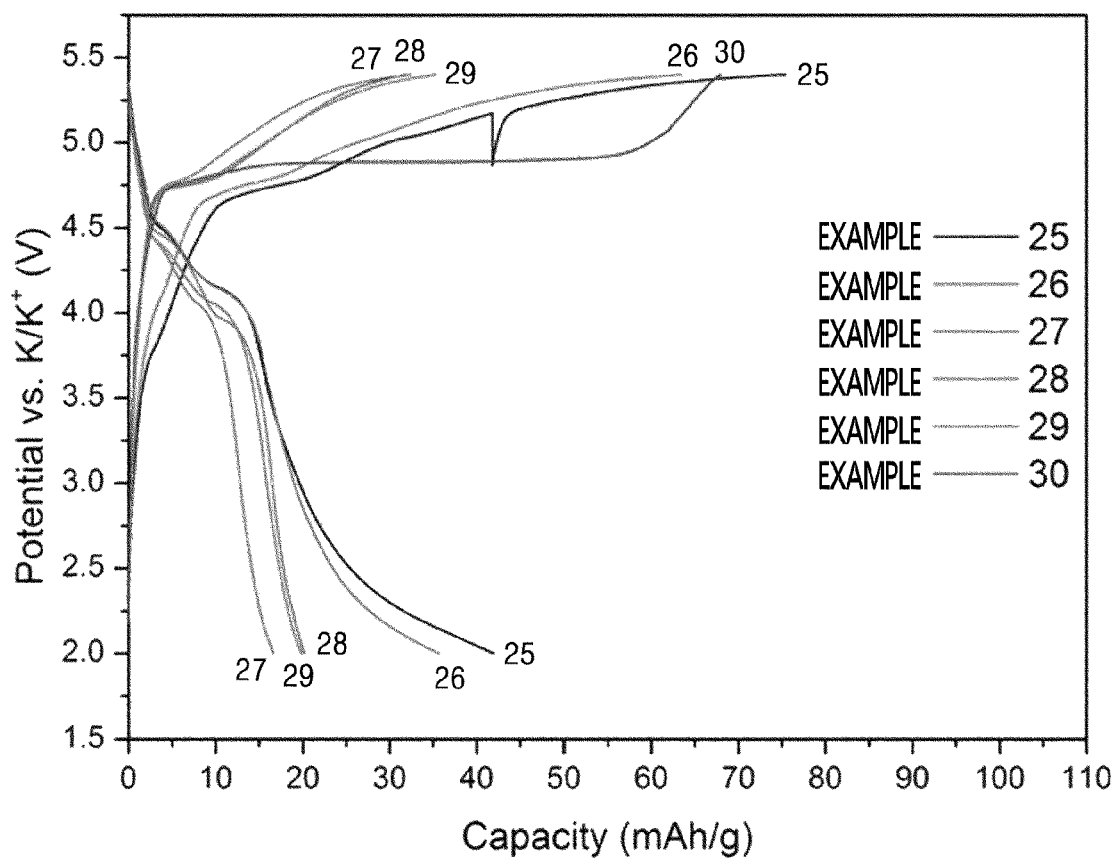

[FIG.17]
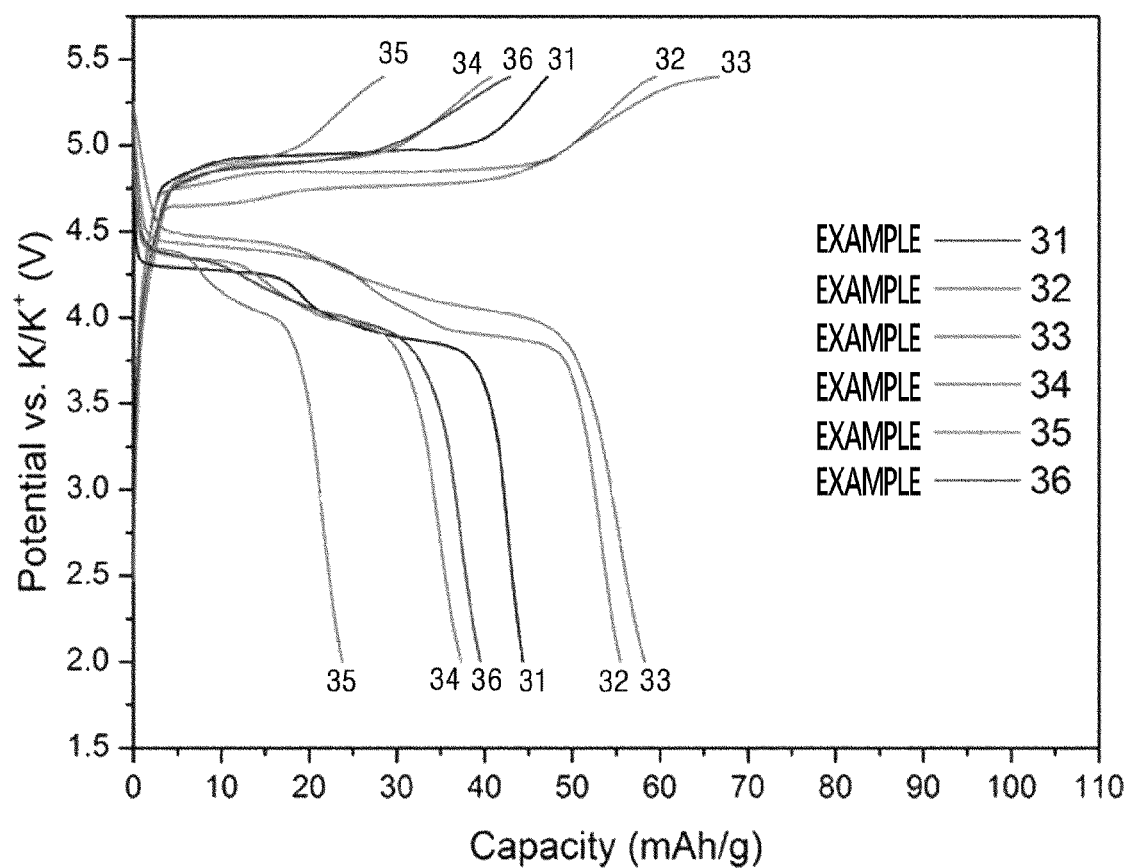

[FIG.18]
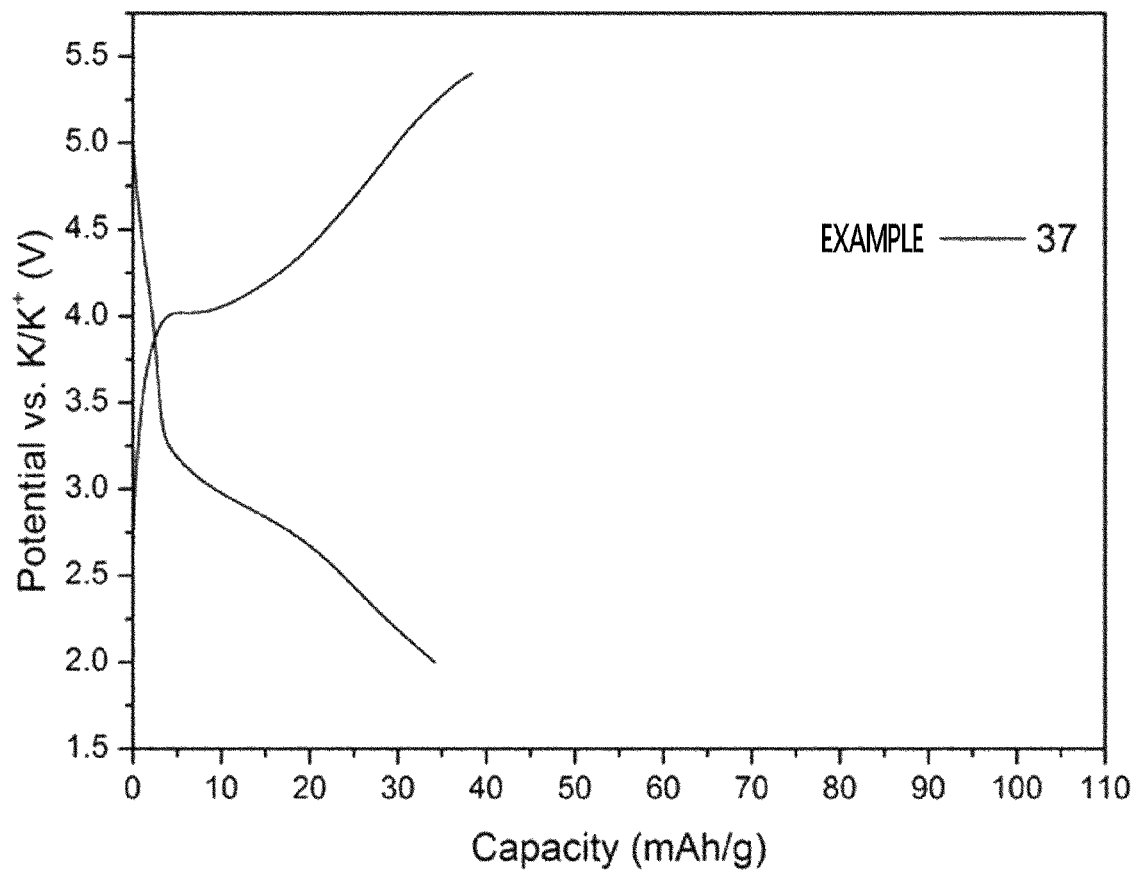

[FIG.19]
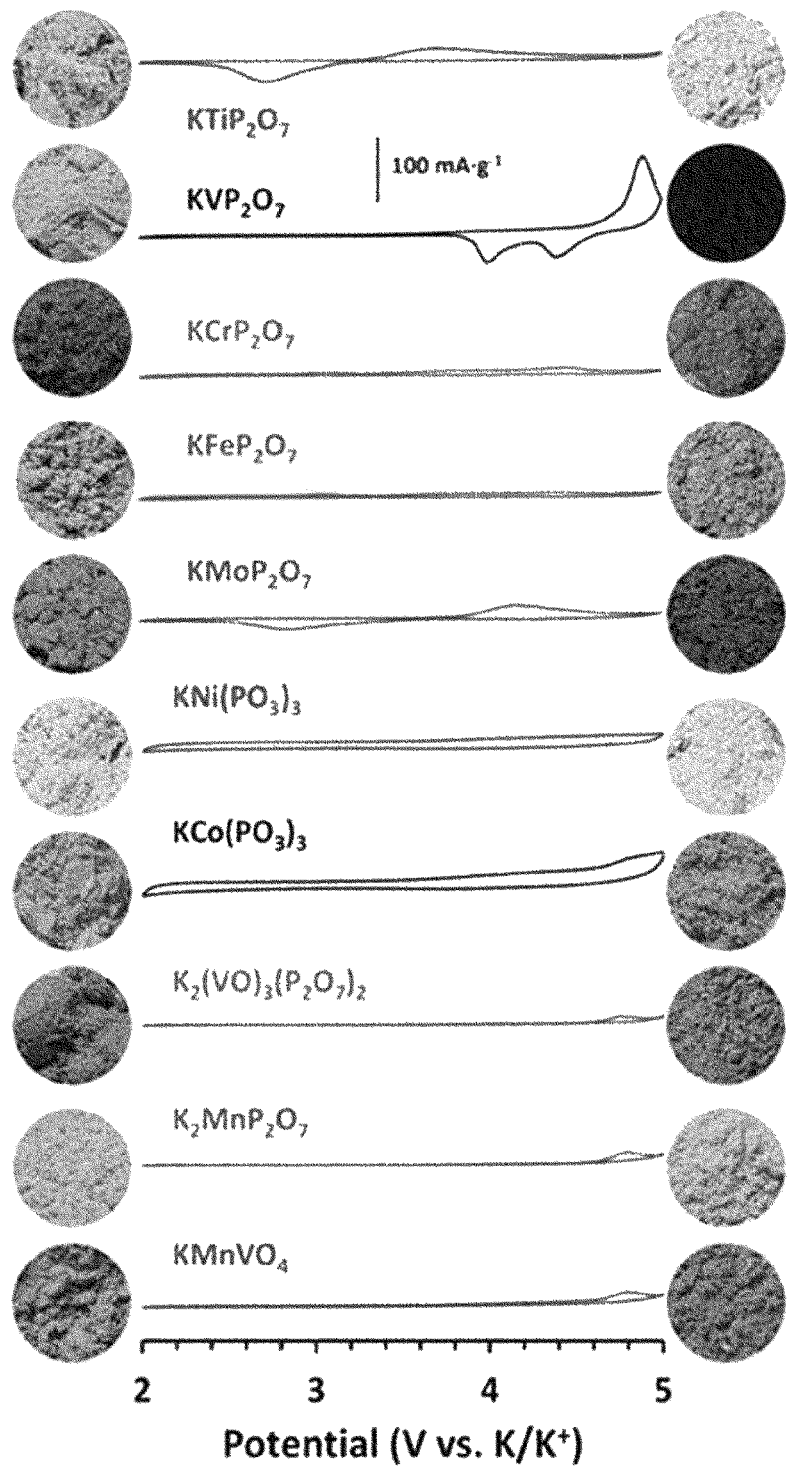

[FIG.20]
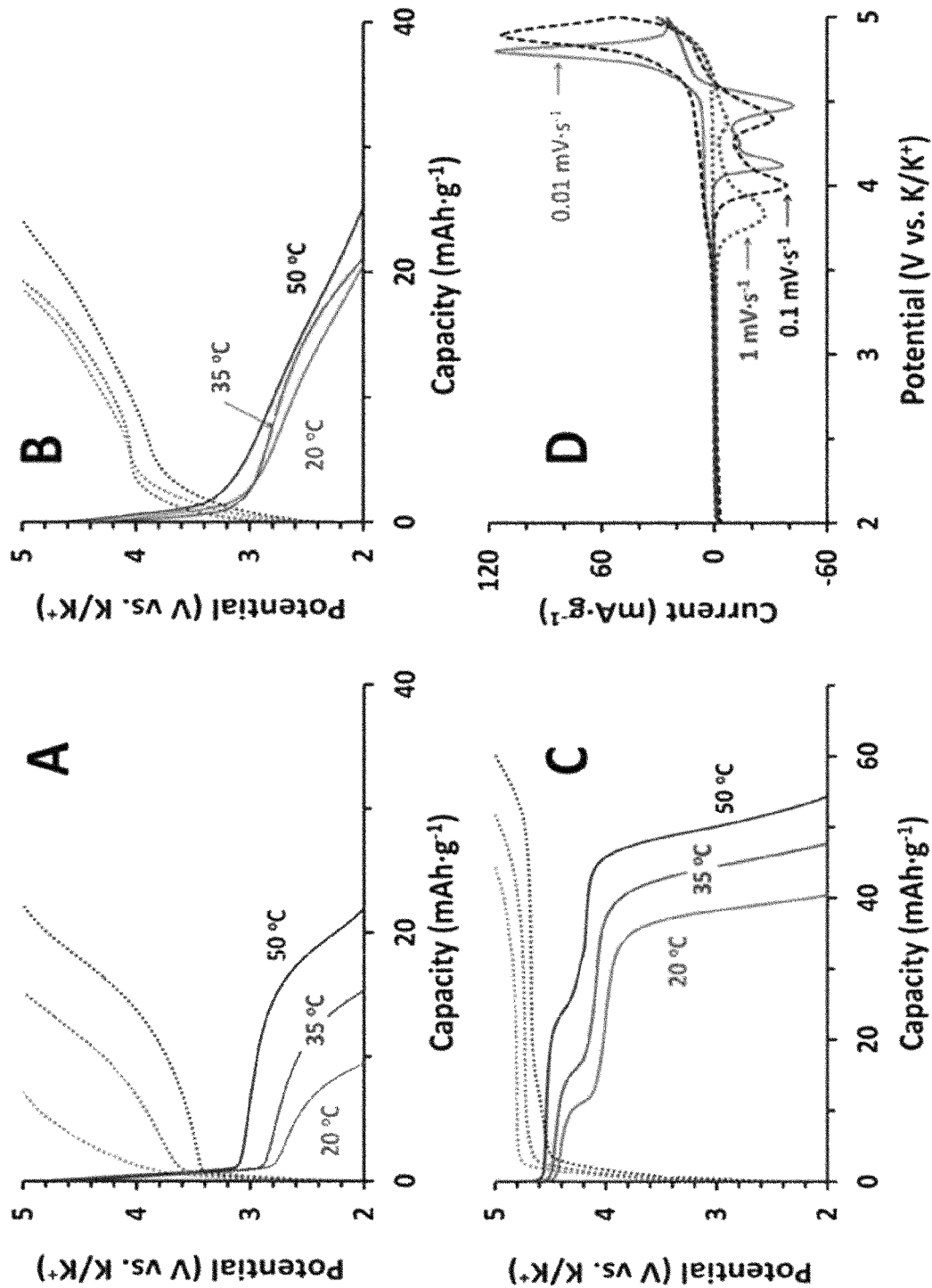

[FIG.21]
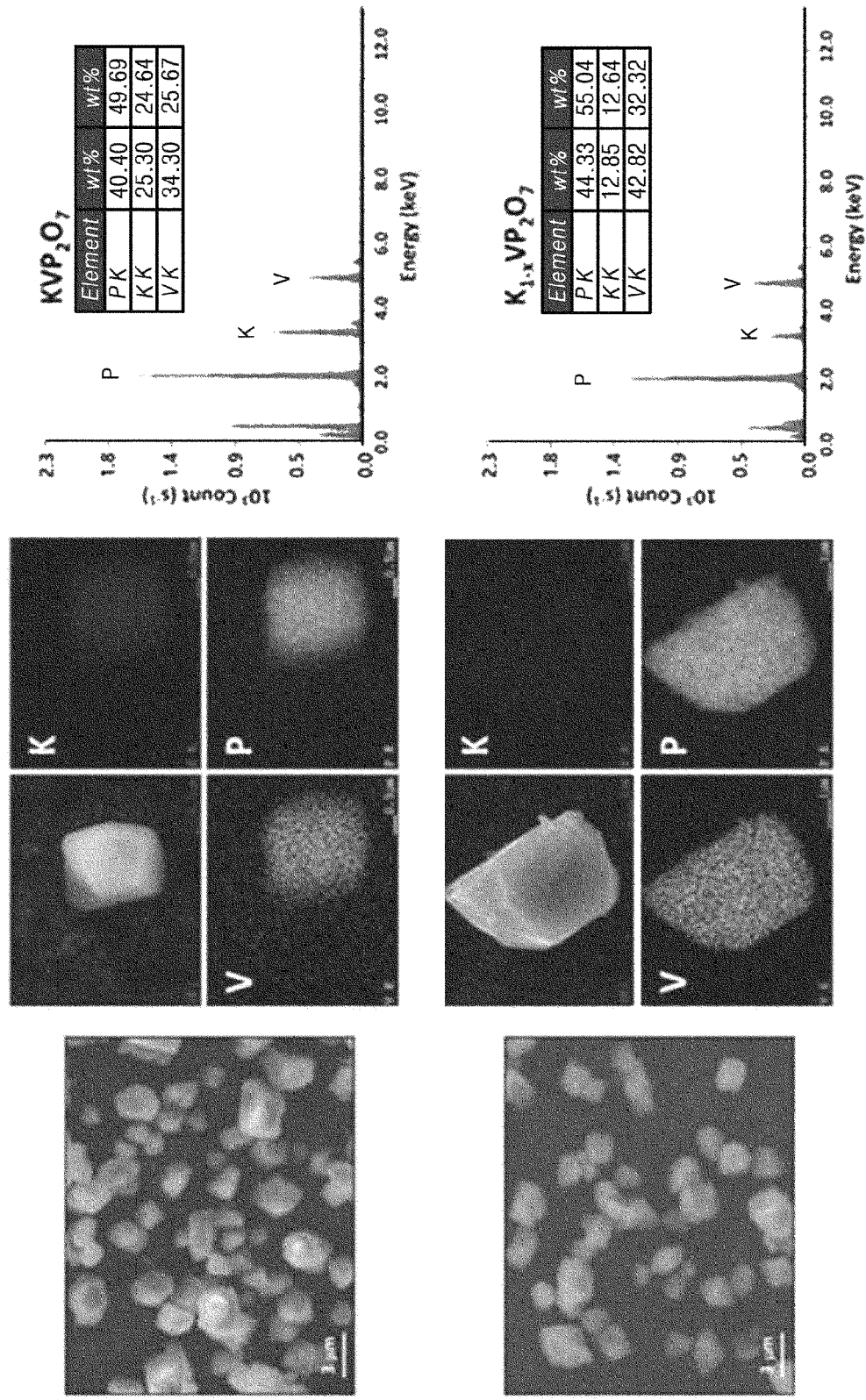

[FIG.22]
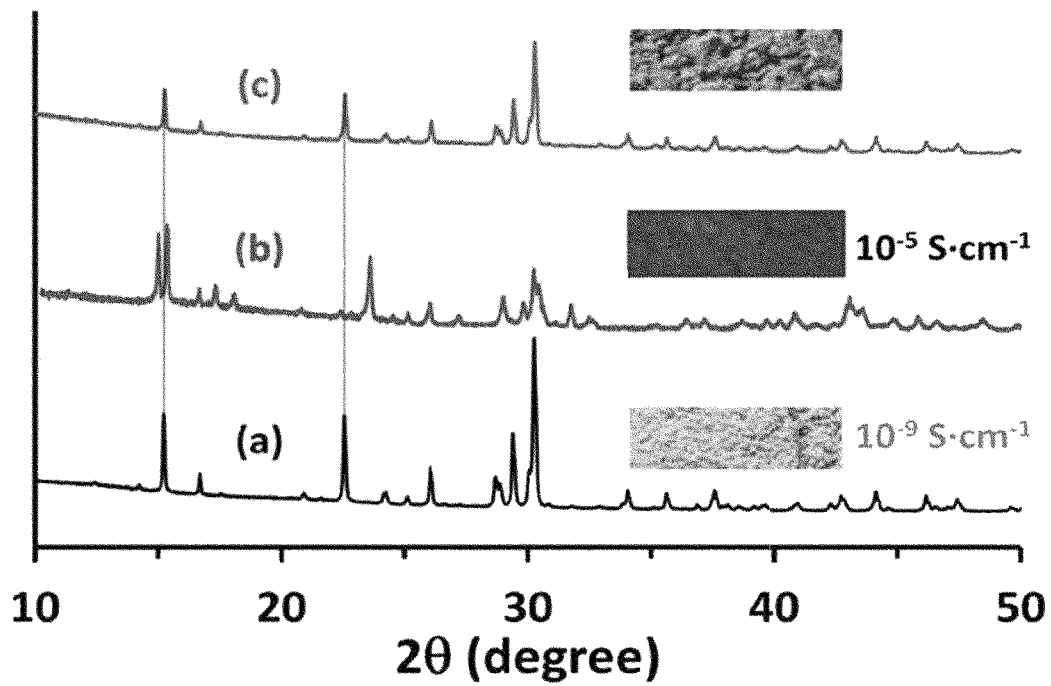
[FIG.23]
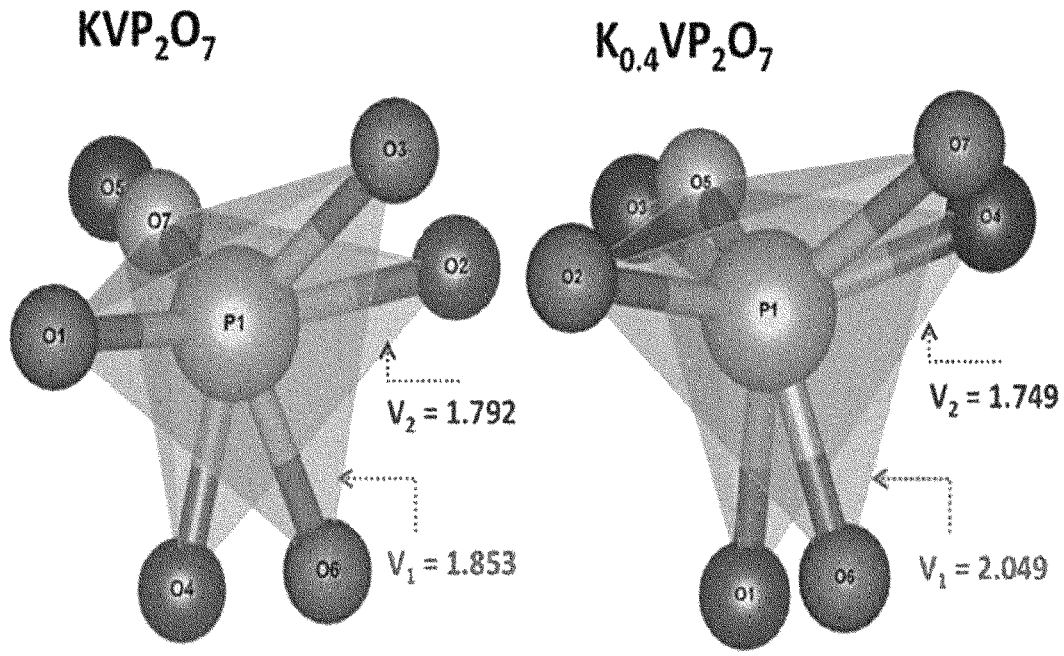

[FIG.24]
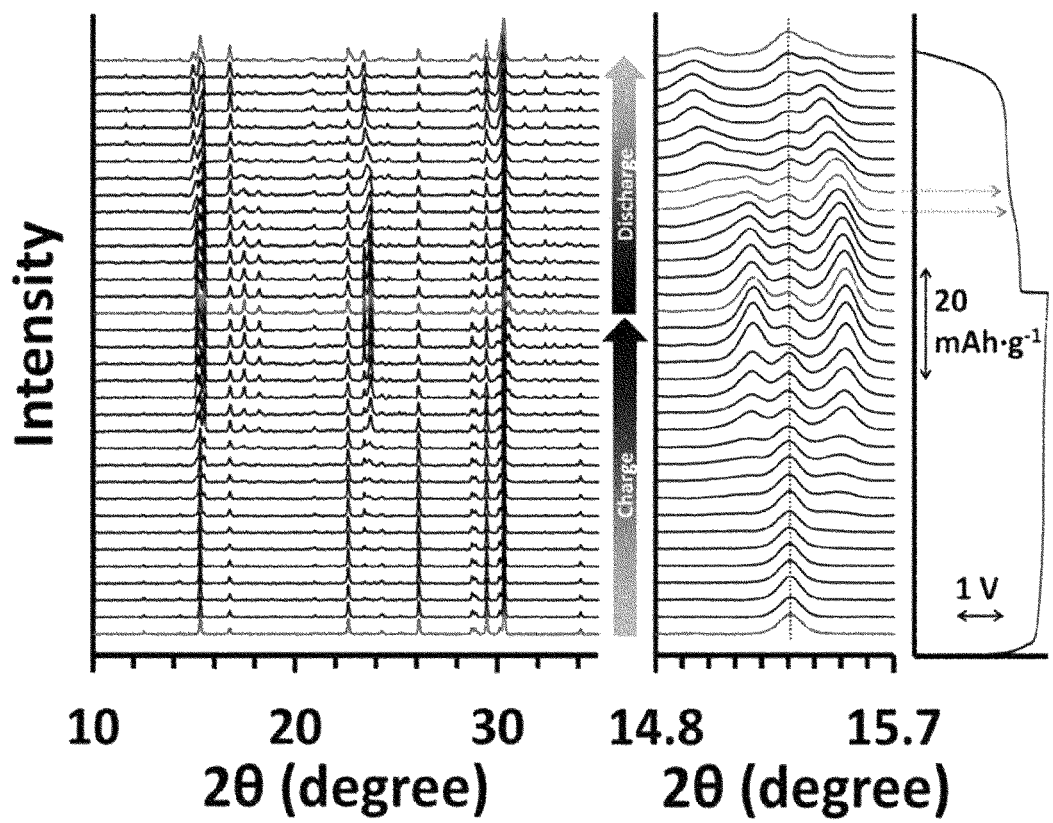

[FIG.25]
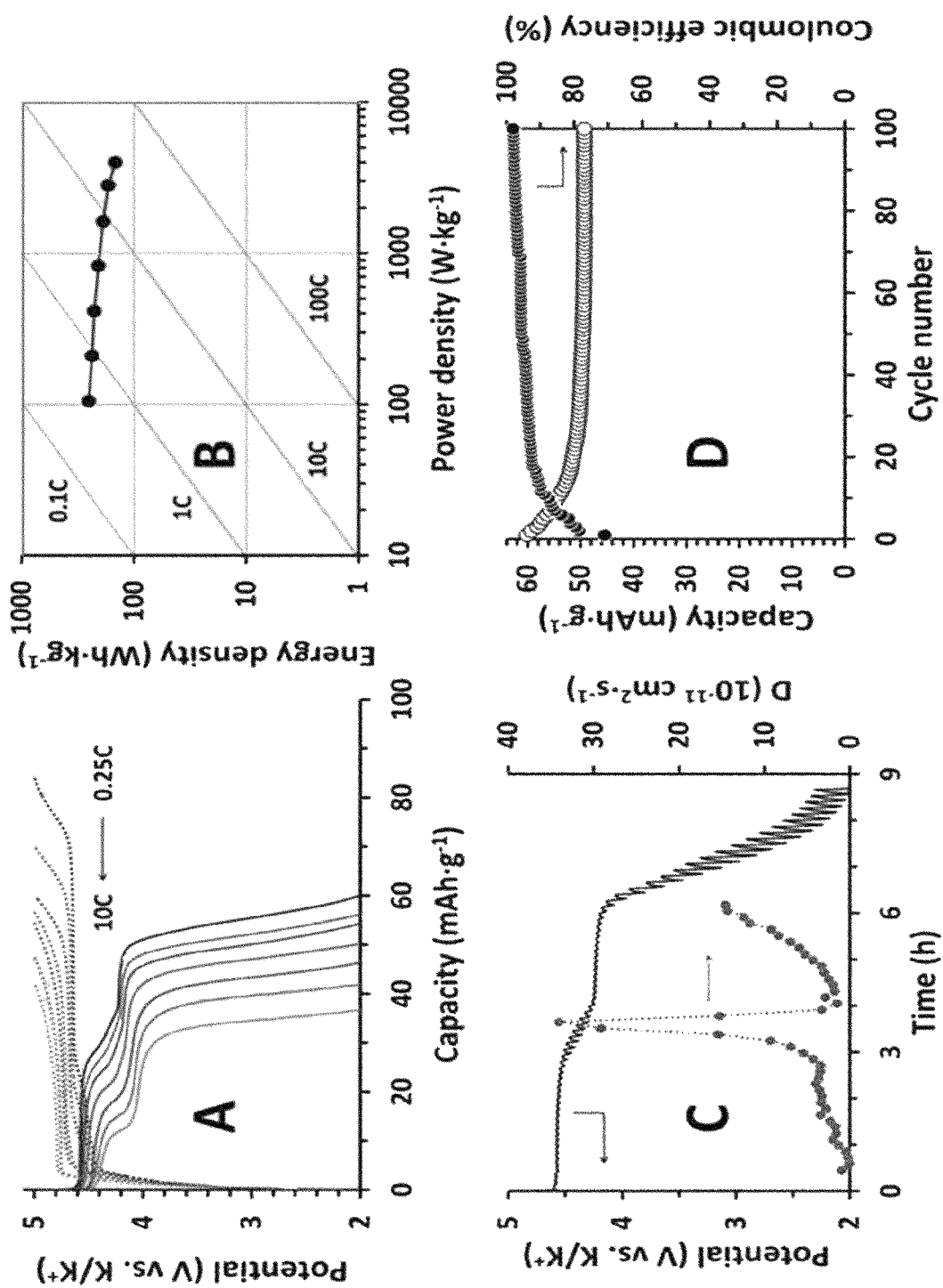

POSITIVE ELECTRODE ACTIVE MATERIAL FOR POTASSIUM SECONDARY BATTERY AND POTASSIUM SECONDARY BATTERY CONTAINING SAME

TECHNICAL FIELD

The present invention relates to a positive electrode active material for a potassium secondary battery and a potassium secondary battery including the same.

BACKGROUND ART

Depletion of fossil fuels such as petroleum and coal and environmental pollution caused by the use of the fossil fuels require efficient use of energy produced, and energy produced in an eco-friendly method, such as solar energy and wind energy do not have a constant production amount, and accordingly, interest in large-capacity secondary batteries that store the produced energy to cope with the required demand is increasing.

The secondary batteries, which have received the most attention until now, are lithium secondary batteries, and the lithium secondary batteries are not only rapidly and increasingly used for power supply of portable electronic devices and electric vehicles by allowing electric energy to be charged and discharged over a long period of time at a high density, but also widely used for energy storage systems (ESSs) configured to store electric power produced in a power plant and efficiently manage electric energy produced by methods such as solar energy and wind energy.

However, since lithium used in the lithium secondary batteries is a limited resource localized in specific areas, there is a problem that it is not only expensive but also difficult to cope with growing demands for batteries and energy storage devices.

To resolve the above-described problem, there is a growing interest in non-lithium batteries which do not use lithium as a main raw material, and the non-lithium batteries use alkali metals, alkaline earth metals, Group 3A metals, transition metals, and the like except for lithium.

Secondary batteries based on alkali metal ions such as $Na^+$ and $K^+$ which have a large amount of reserves, are considerably inexpensive as compared with the lithium-ion batteries, and thus may be suitably used, particularly, for batteries for ESSs.

Among these, metal oxides having a layered structure in the form of O3, P2 and P3, Prussian blue having an open framework structure, phosphates, fluorophosphates, pyrophosphates, sulfides, and the like have been developed as positive electrode active materials for sodium-ion batteries, but materials that meet a sufficient level of capacity, lifespan, and the like are still rare.

Potassium is similar in potential to lithium, and mobility of potassium ions is excellent, and thus a potential for secondary batteries is considerable, but little attention has been received until now. Accordingly, studies on a Prussian blue-like material ($KFe^{III}Fe^{II}(CN)_6$) disclosed in the following patent document have been mainly and actively conducted as a positive electrode active material for a potassium secondary battery, and it has been known that materials such as $K_xTiS_2$, $K_xCoO_2$, $K_xMnO_2$, and the like may also be used as the positive electrode active material, but as compared with lithium secondary batteries or the sodium secondary batteries, positive electrode active materials for potassium secondary batteries have been rarely studied.

[Disclosure]

TECHNICAL PROBLEM

The present invention is directed to providing a material which may be used as a positive electrode active material for a potassium secondary battery and a potassium secondary battery including the material.

TECHNICAL SOLUTION

One aspect of the present invention provides a positive electrode active material for a potassium secondary battery, which is a crystalline material including K, transition metals, P, and O, and the material includes, as a main phase, a phase showing a diffraction peak having a relative intensity of 5% or more in a range of Bragg angles (2θ) of an X-ray diffraction pattern of 14.7° to 15.7°, 22.1° to 23.1°, 25.5° to 26.5°, and 29.7° to 30.8°, when a relative intensity of a diffraction peak having the strongest intensity is taken as 100% in the powder X-ray diffraction pattern of the material.

Another aspect of the present invention provides a potassium secondary battery including a positive electrode, a negative electrode, and an electrolyte, and the positive electrode includes a positive electrode active material including K, transition metals, P, and O, and the material includes, as a main phase, a phase showing a diffraction peak having a relative intensity of 5% or more in a range of Bragg angles (2θ) of an X-ray diffraction pattern of 14.7° to 15.7°, 22.1° to 23.1°, 25.5° to 26.5°, and 29.7° to 30.8°, when a relative intensity of a diffraction peak having the strongest intensity is taken as 100% in the powder X-ray diffraction pattern.

ADVANTAGEOUS EFFECTS

According to one embodiment of the present invention, potassium ions are easily reversibly intercalated/de-intercalated, have excellent structural stability and are excellent in charge and discharge cycle characteristics, and thus it is expected to be suitably used, especially, for an energy storage system (ESS).

Further, a positive electrode active material for a potassium secondary battery according to one embodiment of the present invention can use a non-aqueous electrolyte.

According to another embodiment of the present invention, there is provided a potassium secondary battery including the positive electrode active material for a potassium secondary battery.

DESCRIPTION OF DRAWINGS

FIG. 1 shows a portion where Bragg angles (2θ) of a X-ray diffraction pattern of a positive electrode active material synthesized according to Example 1 of the present invention are 14.7° to 15.7°, 22.1° to 23.1°, 25.5° to 26.5°, and 29.7° to 30.8°.

FIG. 2 shows X-ray diffraction patterns of positive electrode active materials synthesized according to Examples 1 to 18 of the present invention.

FIG. 3 shows X-ray diffraction patterns of positive electrode active materials synthesized according to Examples 19 to 36 of the present invention.

FIG. 4 shows a X-ray diffraction pattern of a positive electrode active material synthesized according to Example 37 of the present invention.

FIG. 5 shows the first charge and discharge results for the positive electrode active materials synthesized according to Examples 1 to 6 of the present invention.

FIG. 6 shows the first charge and discharge results for the positive electrode active materials synthesized according to Examples 7 to 12 of the present invention.

FIG. 7 shows the first charge and discharge results for the positive electrode active materials synthesized according to Examples 13 to 18 of the present invention.

FIG. 8 shows the first charge and discharge results for the positive electrode active materials synthesized according to Examples 19 to 24 of the present invention.

FIG. 9 shows the first charge and discharge results for the positive electrode active materials synthesized according to Examples 25 to 30 of the present invention.

FIG. 10 shows the first charge and discharge results for the positive electrode active materials synthesized according to Examples 31 to 36 of the present invention.

FIG. 11 shows the first charge and discharge result for the positive electrode active material synthesized according to Example 37 of the present invention.

FIG. 12 shows $10^{th}$ charge and discharge results for the positive electrode active materials synthesized according to Examples 1 to 6 of the present invention.

FIG. 13 shows $10^{th}$ charge and discharge results for the positive electrode active materials synthesized according to Examples 7 to 12 of the present invention.

FIG. 14 shows $10^{th}$ charge and discharge results for the positive electrode active materials synthesized according to Examples 13 to 18 of the present invention.

FIG. 15 shows $10^{th}$ charge and discharge results for the positive electrode active materials synthesized according to Examples 19 to 24 of the present invention.

FIG. 16 shows $10^{th}$ charge and discharge for the positive electrode active materials synthesized according to Examples 25 to 30 of the present invention.

FIG. 17 shows $10^{th}$ charge and discharge results for the positive electrode active materials synthesized according to Examples 31 to 36 of the present invention.

FIG. 18 shows a $10^{th}$ charge and discharge result for the positive electrode active material synthesized according to Example 37 of the present invention.

FIG. 19 shows cyclic voltammograms of the positive electrode active materials according to Examples and Comparative Examples of the present invention and whether the colors of the materials have changed during the process.

FIG. 20 shows results after constant current charging and discharging for $KTiP_2O_7$, $KVP_2O_7$, and $KMoP_2O_7$.

FIG. 21 shows results of examining shapes and compositions of $KVP_2O_7$ and $K_{1-x}VP_2O_7$-chemically oxidized $KVP_2O_7$ with $NO_2BF_4$ using field emission scanning electron microscopy (FESEM) and energy dispersive X-ray spectroscopy (FESEM).

FIG. 22 shows X-ray diffraction (XRD) analysis results for $KVP_2O_7$ and $K_{0.4}VP_2O_7$.

FIG. 23 shows the difference in forms of $PO_4$ tetrahedra of a $K_{0.4}VP_2O_7$ phase and a $KVP_2O_7$ phase when projected along the P1-P2 bonding.

FIG. 24 shows results of examining a structural change of the positive electrode active material during charging and discharging processes through synchrotron in-situ XRD analysis.

FIG. 25 shows results of evaluating battery characteristics of coin cells using positive electrode active materials manufactured according to Examples of the present invention.

BEST MODE

Hereinafter, positive electrode active materials according to exemplary embodiments and potassium secondary batteries provided with positive electrodes including the same will be described in more detail. However, the following embodiments are presented as examples, whereby the present invention is not limited thereto, and the present invention is defined by the scope of the following claims to be described later.

A positive electrode active material for a potassium secondary battery according to the present invention includes K, transition metals, P, and O, and may be a material including, as a main phase, a phase showing a diffraction peak having a relative intensity of 5% or more in a range of Bragg angles (2θ) of an X-ray diffraction pattern of 14.7° to 15.7°, 22.1° to 23.1°, 25.5° to 26.5°, and 29.7° to 30.8°, when a relative intensity of a diffraction peak having the strongest intensity is taken as 100% in the powder X-ray diffraction pattern.

Such a positive electrode active material is made of an inorganic material having a relatively excellent stability as compared with an organic material, and when the positive electrode active material has the X-ray diffraction pattern, the positive electrode active material has a tunnel-like crystal structure, so that potassium ions having a relatively greater ionic radius than lithium or sodium may be easily intercalated and deintercalated, and structural stability becomes excellent, and accordingly, charge and discharge cycle characteristics become excellent and a battery using a non-aqueous electrolyte may be constituted.

Further, a positive electrode active material for a potassium secondary battery may further include one or more selected from Li, Na, Rb, Al, La, Gd, and Lu.

Further, the positive electrode active material may be a compound represented by the following Formula 1, $$(K_{1-a}M1_a)(M2_{1-b}M3_b)P_cO_d \quad \text{[Formula 1]}$$

wherein in Formula 1, 0≤a≤0.2, 0≤b≤0.7, 1.8≤c≤2.2, and 6.8≤d≤7.2, and M1 is at least one element selected from alkali metal elements and alkaline earth metals other than K, and M2 and M3 are at least one element selected from transition metals.

For example, the positive electrode active material may be a compound represented by the following Formula 2, $$(K_{1-a}M1_a)(M2_{1-b}M3_b)P_cO_d \quad \text{[Formula 2]}$$

wherein in Formula 2, 0≤a≤0.2, 0≤b≤0.7, 1.8≤c≤2.2, and 6.8≤d≤7.2, and M1 is at least one element selected from alkali metal elements and alkaline earth metals, other than K, and M2 and M3 are at least one element selected from V, Ti, Fe, Cr, Mo, Mn, Co, Ni, Al, La, Gd, and Lu.

For example, the positive electrode active material may be a compound represented by the following Formula 3, $$(K_{1-a}M1_a)(V_{1-b}M3_b)P_cO_d \quad \text{[Formula 3]}$$

wherein in Formula 3, 0≤a≤0.2, 0≤b≤0.7, 1.8≤c≤2.2, and 6.8≤d≤7.2, and M1 is at least one element selected from alkali metal elements and alkaline earth metal elements other than K, and M3 is at least one element selected from Ti, Fe, Cr, Mo, Mn, Co, Ni, Al, La, Gd, and Lu.

For example, the positive electrode active material may specifically be $KVP_2O_7$, $KTiP_2O_7$, $KCrP_2O_7$, $KFeP_2O_7$, or $KMoP_2O_7$.

According to one embodiment of the present invention, there is provided a positive electrode active material for a potassium secondary battery, which is a crystalline material including K, transition metals, P and O, and in which a phase transition to a monoclinic crystal structure and a triclinic crystal structure is dynamically performed in a charge and discharge process.

A positive electrode active material according to the present invention may obtain improved capacity and excellent high-rate characteristics through a process in which a phase transition to a monoclinic crystal structure and a triclinic crystal structure is dynamically performed in a charge and discharge process.

Further, the crystalline material may have a monoclinic crystal structure in a charged state and a triclinic crystal structure in a discharged state.

Further, the crystalline material may have a composition of Formula 1 in a charged state and a composition of Formula 2 in a discharged state,

$$(K_{1-a}M1_a)(V_{1-b}M2_b)P_cO_d \quad \text{[Formula 1]}$$

wherein, $0 \leq a \leq 0.1$, $0 \leq b \leq 0.7$, $1.8 \leq c \leq 2.2$, and $6.8 \leq d \leq 7.2$, and M1 is one or more among alkali metal elements other than K, and M2 is at least one element selected from Ti, Fe, Cr, Mo, Mn, Co, Ni, Al, La, Gd, and Lu,

$$(K_{1-a}M1_a)(V_{1-b-e}M2_b)P_cO_d \quad \text{[Formula 2]}$$

wherein, $0 \leq a \leq 0.1$, $0 \leq b \leq 0.7$, $1.8 \leq c \leq 2.2$, $6.8 \leq d \leq 7.2$, and $0.55 \leq e \leq 0.65$, and M1 is one or more among alkali metal elements other than K, and M2 is at least one element selected from Ti, Fe, Cr, Mo, Mn, Co, Ni, Al, La, Gd, and Lu.

Further, the crystalline material may have a space group $P2_1/c$ in a charged state and a space group $P\bar{1}$ in a discharged state.

Further, the crystalline material may have a composition of $KVP_2O_7$ in a charged state and a composition of $K_{1-x}VP_2O_7(0.55 \leq x \leq 0.65)$ in a discharged state.

Further, according to another embodiment of the present invention, there may be provided a potassium secondary battery including a positive electrode having a positive electrode active material containing the above-described composition and crystal structure, a negative electrode disposed to be spaced a certain distance from the positive electrode, a separator disposed between the positive electrode and the negative electrode, and an electrolyte filled between the positive electrode and the negative electrode, and the separator.

The positive electrode may include a current collector and a positive electrode active material layer formed on the current collector.

The current collector may include a metal current collector, for example, aluminum foil.

The positive electrode active material layer may be prepared as a composition in the form of a mixture of a positive electrode active material powder having the above-described composition, a conductive material, a binder, and a solvent, molded, and laminated on the metal current collector or coated on the metal current collector to manufacture a positive electrode.

However, the present invention is not limited to the above-described method but may be a form other than the above-described method.

As the conductive material, carbon black, graphite fine particles, or the like may be used, but the present invention is not limited thereto, and any conductive material which can be used in the art may be used. For example, graphite such as natural graphite and artificial graphite; carbon black such as acetylene black, Ketjen black, channel black, furnace black, lamp black, and thermal black; conductive fibers such as carbon fibers and metal fibers; metallic powders such as aluminum or nickel powder; conductive whiskers such as zinc oxide and potassium titanate; conductive metal oxides such as titanium oxide; conductive materials such as polyphenylene derivatives; and the like may be used.

The binder may include a vinylidene fluoride-hexafluoropropylene copolymer, polyvinylidene fluoride, polyacrylonitrile, polymethylmethacrylate, polytetrafluoroethylene, and mixtures thereof, or styrene butadiene rubber-based polymers, or the like, but the present invention is not limited thereto, and any binder which can be used in the art may be used.

As the solvent, N-methylpyrrolidone, acetone, water, or the like may be used, but the present invention is not limited thereto, and any solvent which can be used in the art may be used. Contents of the positive electrode active material, the conductive material, the binder, and the solvent may be adjusted in accordance with characteristics required for a potassium secondary battery, and one or more thereof may not be used as required.

The negative electrode may include a current collector and a negative electrode active material layer formed on the current collector.

The negative electrode active material layer may be manufactured by coating a mixture prepared by mixing a negative electrode active material powder, a conductive material, a binder, and a solvent, directly on a metal current collector, and drying or casting the negative electrode active material composition on a separate substrate, separating and laminating the negative electrode active material composition separated from the substrate on the metal current collector.

The negative electrode active material is not particularly limited as long as it is used in a potassium secondary battery and is capable of reversible intercalation and de-intercalation of potassium ions, for example, includes potassium metal, a potassium alloy, a carbon-based material, or the like.

As a material capable of reversibly intercalating and de-intercalating the potassium ions, any carbon-based negative electrode active material which is a carbon-based material and generally used in conventional lithium secondary batteries may be used. For example, there is crystalline carbon, amorphous carbon, or mixtures thereof. Examples of the crystalline carbon may include amorphous, platy, flaky, spherical, or fibrous natural graphite or artificial graphite, and examples of the amorphous carbon may include, soft carbon (low-temperature calcined carbon) or hard carbon, mesophase pitch carbide, calcined coke, or the like.

Regarding the contents of the negative electrode active material, the conductive material, the binder, and the solvent, the contents of the conductive material, the binder, and the solvent may be controlled or some of which may be omitted depending on the use and configuration of a potassium secondary battery.

The separator may have an excellent electrolyte-retaining property while having low resistance against the movement of ions included in the electrolyte.

The separator may be in the form of a nonwoven fabric or a woven fabric selected from, for example, glass fiber, polyester, Teflon, polyethylene, polypropylene, polytetrafluoroethylene (PTFB), or a combination thereof, and include polyethylene, polypropylene, and the like which are widely used in lithium-ion batteries.

The electrolyte is preferably a non-aqueous electrolyte and may be made of an organic material in which a potassium salt is dissolved in an organic solvent.

The organic solvent may be any organic solvent that can be used in the art. For example, there are propylene carbonate, ethylene carbonate, fluoroethylene carbonate, butylene carbonate, dimethyl carbonate, diethyl carbonate, methyl ethyl carbonate, methyl propyl carbonate, ethyl propyl carbonate, methyl isopropyl carbonate, dipropyl carbonate, dibutyl carbonate, benzonitrile, acetonitrile, tetrahydrofuran, 2-methyltetrahydrofuran, gamma-butyrolactone, dioxolane, 4-methyldioxolane, N, N-dimethylformamide, dimethylacetamide, dimethyl sulfoxide, dioxane, 1,2-dimethoxyethane, sulfolane, dichloroethane, chlorobenzene, nitrobenzene, diethylene glycol, dimethyl ether or mixtures thereof.

The potassium salt may be used without particular limitation as long as it can be used as a potassium salt in the art.

Further, the electrolyte may be a solid electrolyte such as an organic solid electrolyte or an inorganic solid electrolyte. When the solid electrolyte is used, the solid electrolyte may also serve as a separator.

The positive electrode, the negative electrode, the separator, and the electrolyte are accommodated in a case in the same manner as a general method for manufacturing batteries, such as lithium secondary batteries, and finally made into a battery.

Here, it is manufactured by a method in which the positive electrode, the negative electrode, and the separator are stacked and wound, or folded in multiple layers to be accommodated in a case, and then the electrolyte is injected into the case and sealed. Various materials such as metal and plastic may be used as the material of the case, and the case may have various shapes such as a cylindrical shape, a prismatic shape, a pouch shape, and the like.

The present invention will be described in more detail through the following Examples, but the present invention should not be construed as being limited to the following Examples.

Manufacture of Positive Electrode Active Material for Potassium Secondary Battery Hereinafter, a method for manufacturing a positive electrode active material for a potassium secondary battery according to the present invention will be described in detail.

In the case of K, V, Ti, Fe, Cr, Mo, Mn, Co, Ni, and P which are main components of raw materials for manufacturing a positive electrode active material for a potassium secondary battery, potassium carbonate ($K_2CO_3$), vanadium oxide ($V_2O_5$), titanium dioxide ($TiO_2$), iron oxide ($Fe_2O_3$), chromium oxide ($Cr_2O_3$), molybdenum oxide ($Mo_2O_5$), manganese oxide ($Mn_2O_3$), cobalt oxide ($Co_2O_3$), nickel oxide (NiO), and ammonium phosphate (($NH_4$)$_2$$HPO_4$) powder were used.

The raw materials were weighed and mixed so as to have a certain composition, and at this time, an amount of the mixture per sample was adjusted to be 3 g. The mixing of the raw materials as described above was performed manually for 30 minutes in an air atmosphere.

Samples of the mixture obtained as described above were subjected in an air atmosphere or a nitrogen gas atmosphere, in which $H_2$ gas is 0 to 25% and the main component is nitrogen gas at atmospheric pressure or higher and 20 atm or lower. Further, a calcination temperature is preferably 700° C. to 1100° C., and more preferably 800° C. or more to obtain a high-quality positive electrode active material for a potassium secondary battery. Further, a calcination time may be in a range of 30 minutes to 100 hours, and preferably 2 hours to 24 hours considering the quality and productivity.

Hereinafter, the positive electrode active material for a potassium secondary battery of the present invention will be described in detail with reference to more specific Examples.

EXAMPLE 1

To obtain a raw material powder of a positive electrode active material composition for a potassium secondary battery of Example 1, each of 0.4888 g of $K_2CO_3$, 0.6432 g of $V_2O_5$, and 1.8680 g of $(NH_4)_2HPO_4$ was weighed and then they were manually mixed using a mortar in an air atmosphere to obtain 3 g of a raw material powder mixture. 3 g of the raw material powder mixture mixed as described above was put into a crucible and subjected to a calcination process in which a mixed gas containing nitrogen gas as a main component and 15% $H_2$ gas was flowed at a rate of 500 cc/minute in a furnace and heated at 800° C. for 24 hours, followed by pulverization to obtain the positive electrode active material composition for a potassium secondary battery.

Further, a potassium half-cell was manufactured to evaluate the performance of the manufactured positive electrode active material for a potassium secondary battery. In order to manufacture the potassium half-cell, positive electrode active material powder composed of $KVP_2O_7$ synthesized as described above, carbon powder (Super P) as a conductive material, and polyvinylidene fluoride (PVDF) as a binder were mixed in a weight ratio of 75:15:15, and N-methyl pyrrolidone (NMP) as a solvent was added thereto, and mixed and stirred to prepare a positive electrode slurry. This slurry was applied to aluminum foil as a current collector, and then dried in an oven at 120° C. for at least 8 hours to prepare a positive electrode. Further, potassium foil was used as a negative electrode and a reference electrode.

A separator composed of a porous polyethylene membrane was disposed between the positive electrode and the negative electrode manufactured as described above, and then an electrolyte ((0.5 M $KPF_6$/fluoroethylene carbonate (FEC): ethyl methyl carbonate (EMC)) was injected thereinto to manufacture a coin cell.

EXAMPLE 2

A positive electrode was manufactured in the same manner as in Example 1 except that the composition of the raw material powder was changed to 0.4952 g of $K_2CO_3$, 0.3258 g of $V_2O_5$, 0.2863 g of $TiO_2$, and 1.8927 g of $(NH_4)_2HPO_4$ to manufacture a coin cell.

EXAMPLE 3

A positive electrode was manufactured in the same manner as in Example 1 except that the composition of the raw material powder was changed to 0.4952 g of $K_2CO_3$, 0.3259 g of $V_2O_5$, 0.2861 g of $Fe_2O_3$, and 1.8929 g of $(NH_4)_2HPO_4$ to manufacture a coin cell.

EXAMPLE 4

A positive electrode was manufactured in the same manner as in Example 1 except that the composition of the raw material powder was changed to 0.4528 g of $K_2CO_3$, 0.2979 g of $V_2O_5$, 0.5188 g of $CrCl_3$, and 1.7305 g of $(NH_4)_2HPO_4$ to manufacture a coin cell.

EXAMPLE 5

A positive electrode was manufactured in the same manner as in Example 1 except that the composition of the raw material powder was changed to 0.4683 g of $K_2CO_3$, 0.3082 g of $V_2O_5$, 0.4335 g of $MoO_2$, and 1.7900 g of $(NH_4)_2HPO_4$ to manufacture a coin cell.

EXAMPLE 6

A positive electrode was manufactured in the same manner as in Example 1 except that the composition of the raw material powder was changed to 0.4958 g of $K_2CO_3$, 0.3262 g of $V_2O_5$, 0.2832 g of $Mn_2O_3$, and 1.8949 g of $(NH_4)_2HPO_4$ to manufacture a coin cell.

EXAMPLE 7

A positive electrode was manufactured in the same manner as in Example 1 except that the composition of the raw material powder was changed to 0.4950 g of $K_2CO_3$, 0.3257 g of $V_2O_5$, 0.2875 g of $Co_3O_4$, and 1.8918 g of $(NH_4)_2HPO_4$ to manufacture a coin cell.

EXAMPLE 8

A positive electrode was manufactured in the same manner as in Example 1 except that the composition of the raw material powder was changed to 0.4983 g of $K_2CO_3$, 0.3279 g of $V_2O_5$, 0.2693 g of NiO, and 1.9045 g of $(NH_4)_2HPO_4$ to manufacture a coin cell.

EXAMPLE 9

A positive electrode was manufactured in the same manner as in Example 1 except that the composition of the raw material powder was changed to 0.4974 g of $K_2CO_3$, 0.2182 g of $V_2O_5$, 0.1917 g of $TiO_2$, 0.1916 g of $Fe_2O_3$, and 1.9011 g of $(NH_4)_2HPO_4$ to manufacture a coin cell.

EXAMPLE 10

A positive electrode was manufactured in the same manner as in Example 1 except that the composition of the raw material powder was changed to 0.4680 g of $K_2CO_3$, 0.2053 g of $V_2O_5$, 0.1804 g of $TiO_2$, 0.3575 g of $CrCl_3$, and 1.7888 g of $(NH_4)_2HPO_4$ to manufacture a coin cell.

EXAMPLE 11

A positive electrode was manufactured in the same manner as in Example 1 except that the composition of the raw material powder was changed to 0.4790 g of $K_2CO_3$, 0.2101 g of $V_2O_5$, 0.1846 g of $TiO_2$, 0.2956 g of $MnO_2$, and 1.8307 g of $(NH_4)_2HPO_4$ to manufacture a coin cell.

EXAMPLE 12

A positive electrode was manufactured in the same manner as in Example 1 except that the composition of the raw material powder was changed to 0.4978 g of $K_2CO_3$, 0.2184 g of $V_2O_5$, 0.1918 g of $TiO_2$, 0.1895 g of $Mn_2O_3$, and 1.9025 g of $(NH_4)_2HPO_4$ to manufacture a coin cell.

EXAMPLE 13

A positive electrode was manufactured in the same manner as in Example 1 except that the composition of the raw material powder was changed to 0.4972 g of $K_2CO_3$, 0.2181 g of $V_2O_5$, 0.1916 g of $TiO_2$, 0.1925 g of $Co_3O_4$, and 1.9005 g of $(NH_4)_2HPO_4$ to manufacture a coin cell.

EXAMPLE 14

A positive electrode was manufactured in the same manner as in Example 1 except that the composition of the raw material powder was changed to 0.4995 g of $K_2CO_3$, 0.2191 g of $V_2O_5$, 0.1925 g of $TiO_2$, 0.1799 g of NiO, and 1.9090 g of $(NH_4)_2HPO_4$ to manufacture a coin cell.

EXAMPLE 15

A positive electrode was manufactured in the same manner as in Example 1 except that the composition of the raw material powder was changed to 0.4680 g of $K_2CO_3$, 0.2053 g of $V_2O_5$, 0.1803 g of $Fe_2O_3$, 0.3575 g of $CrCl_3$, and 1.7889 g of $(NH_4)_2HPO_4$ to manufacture a coin cell.

EXAMPLE 16

A positive electrode was manufactured in the same manner as in Example 1 except that the composition of the raw material powder was changed to 0.4790 g of $K_2CO_3$, 0.2101 g of $V_2O_5$, 0.1845 g of $Fe_2O_3$, 0.2956 g of $MnO_2$, and 1.8308 g of $(NH_4)_2HPO_4$ to manufacture a coin cell.

EXAMPLE 17

A positive electrode was manufactured in the same manner as in Example 1 except that the composition of the raw material powder was changed to 0.4978 g of $K_2CO_3$, 0.2184 g of $V_2O_5$, 0.1917 g of $Fe_2O_3$, 0.1895 g of $Mn_2O_3$, and 1.9026 g of $(NH_4)_2HPO_4$ to manufacture a coin cell.

EXAMPLE 18

A positive electrode was manufactured in the same manner as in Example 1 except that the composition of the raw material powder was changed to 0.4973 g of $K_2CO_3$, 0.2181 g of $V_2O_5$, 0.1915 g of $Fe_2O_3$, 0.1925 g of $Co_3O_4$, and 1.9006 g of $(NH_4)_2HPO_4$ to manufacture a coin cell.

EXAMPLE 19

A positive electrode was manufactured in the same manner as in Example 1 except that the composition of the raw material powder was changed to 0.4995 g of $K_2CO_3$, 0.2191 g of $V_2O_5$, 0.1924 g of $Fe_2O_3$, 0.1800 g of NiO, and 1.9091 g of $(NH_4)_2HPO_4$ to manufacture a coin cell.

EXAMPLE 20

A positive electrode was manufactured in the same manner as in Example 1 except that the composition of the raw material powder was changed to 0.4517 g of $K_2CO_3$, 0.1981 g of $V_2O_5$, 0.3450 g of $CrCl_3$, 0.2788 g of $MoO_2$, and 1.7264 g of $(NH_4)_2HPO_4$ to manufacture a coin cell.

EXAMPLE 21

A positive electrode was manufactured in the same manner as in Example 1 except that the composition of the raw material powder was changed to 0.4684 g of $K_2CO_3$, 0.2055 g of $V_2O_5$, 0.3578 g of $CrCl_3$, 0.1783 g of $Mn_2O_3$, and 1.7901 g of $(NH_4)_2HPO_4$ to manufacture a coin cell.

EXAMPLE 22

A positive electrode was manufactured in the same manner as in Example 1 except that the composition of the raw material powder was changed to 0.4679 g of $K_2CO_3$, 0.2052 g of $V_2O_5$, 0.3574 g of $CrCl_3$, 0.1812 g of $Co_3O_4$, and 1.7883 g of $(NH_4)_2HPO_4$ to manufacture a coin cell.

EXAMPLE 23

A positive electrode was manufactured in the same manner as in Example 1 except that the composition of the raw material powder was changed to 0.4699 g of $K_2CO_3$, 0.2061 g of $V_2O_5$, 0.3589 g of $CrCl_3$, 0.1693 g of NiO, and 1.7958 g of $(NH_4)_2HPO_4$ to manufacture a coin cell.

EXAMPLE 24

A positive electrode was manufactured in the same manner as in Example 1 except that the composition of the raw material powder was changed to 0.4793 g of $K_2CO_3$, 0.2103 g of $V_2O_5$, 0.2958 g of $MoO_2$, 0.1825 g of $Mn_2O_3$, and 1.8321 g of $(NH_4)_2HPO_4$ to manufacture a coin cell.

EXAMPLE 25

A positive electrode was manufactured in the same manner as in Example 1 except that the composition of the raw material powder was changed to 0.4789 g of $K_2CO_3$, 0.2101 g of $V_2O_5$, 0.2955g of $MoO_2$, 0.1854 g of $Co_3O_4$, and 1.8302 g of $(NH_4)_2HPO_4$ to manufacture a coin cell.

EXAMPLE 26

A positive electrode was manufactured in the same manner as in Example 1 except that the composition of the raw material powder was changed to 0.4809 g of $K_2CO_3$, 0.2110 g of $V_2O_5$, 0.2968 g of $MoO_2$, 0.1733 g of NiO, and 1.8381 g of $(NH_4)_2HPO_4$ to manufacture a coin cell.

EXAMPLE 27

A positive electrode was manufactured in the same manner as in Example 1 except that the composition of the raw material powder was changed to 0.4976 g of $K_2CO_3$, 0.2183 g of $V_2O_5$, 0.1895 g of $Mn_2O_3$, 0.1927 g of $Co_3O_4$, and 1.9019 g of $(NH_4)_2HPO_4$ to manufacture a coin cell.

EXAMPLE 28

A positive electrode was manufactured in the same manner as in Example 1 except that the composition of the raw material powder was changed to 0.4999 g of $K_2CO_3$, 0.2193 g of $V_2O_5$, 0.1903 g of $Mn_2O_3$, 0.1801 g of NiO, and 1.9105 g of $(NH_4)_2HPO_4$ to manufacture a coin cell.

EXAMPLE 29

A positive electrode was manufactured in the same manner as in Example 1 except that the composition of the raw material powder was changed to 0.4993 g of $K_2CO_3$, 0.2190 g of $V_2O_5$, 0.1933 g of $Co_3O_4$, 0.1799 g of NiO, and 1.9084 g of $(NH_4)_2HPO_4$ to manufacture a coin cell.

EXAMPLE 30

A positive electrode was manufactured in the same manner as in Example 1 except that the composition of the raw material powder was changed to 0.4432 g of $K_2CO_3$, 0.6481 g of $V_2O_5$, 0.0263 g of $Li_2CO_3$, and 1.8823 g of $(NH_4)_2HPO_4$ to manufacture a coin cell.

EXAMPLE 31

A positive electrode was manufactured in the same manner as in Example 1 except that the composition of the raw material powder was changed to 0.4416 g of $K_2CO_3$, 0.6456 g of $V_2O_5$, 0.0376 g of $Na_2CO_3$, and 1.8752 g of $(NH_4)_2HPO_4$ to manufacture a coin cell.

EXAMPLE 32

A positive electrode was manufactured in the same manner as in Example 1 except that the composition of the raw material powder was changed to 0.4351 g of $K_2CO_3$, 0.6362 g of $V_2O_5$, 0.0808 g of $Rb_2O_3$, and 1.8478 g of $(NH_4)_2HPO_4$ to manufacture a coin cell.

EXAMPLE 33

A positive electrode was manufactured in the same manner as in Example 1 except that the composition of the raw material powder was changed to 0.4934 g of $K_2CO_3$, 0.5844 g of $V_2O_5$, 0.0364 g of $V_2O_3$, and 1.8858 g of $(NH_4)_2HPO_4$ to manufacture a coin cell.

EXAMPLE 34

A positive electrode was manufactured in the same manner as in Example 1 except that the composition of the raw material powder was changed to 0.4806 g of $K_2CO_3$, 0.5692 g of $V_2O_5$, 0.1133 g of $Al_2O_3$, and 1.8369 g of $(NH_4)_2HPO_4$ to manufacture a coin cell.

EXAMPLE 35

A positive electrode was manufactured in the same manner as in Example 1 except that the composition of the raw material powder was changed to 0.4786 g of $K_2CO_3$, 0.5668 g of $V_2O_5$, 0.1255 g of $La_2O_3$, and 1.8291 g of $(NH_4)_2HPO_4$ to manufacture a coin cell.

EXAMPLE 36

A positive electrode was manufactured in the same manner as in Example 1 except that the composition of the raw material powder was changed to 0.4766 g of $K_2CO_3$, 0.5645 g of $V_2O_5$, 0.1372 g of $Gd_2O_3$, and 1.8217 g of $(NH_4)_2HPO_4$ to manufacture a coin cell.

EXAMPLE 37

A positive electrode was manufactured in the same manner as in Example 1 except that the composition of the raw material powder was changed to 0.4345 g of $K_2CO_3$, 0.9050 g of $MoO_2$, and 1.6605 g of $(NH_4)_2HPO_4$ to manufacture a coin cell.

X-ray Diffraction (XRD) Analysis

In order to analyze a crystal structure of the positive electrode active materials synthesized according to Examples 1 to 36, a powder XRD analysis was performed, and the results are shown in FIGS. 1 to 3.

The XRD analysis was performed using a diffractometer ((manufactured by Rigaku Co., Ltd., model: D/MAX2500V/PC powder diffractometer, $\lambda=1.5405$ Å) using a radiation of copper-potassium (Cu—K), under the condition that 2θ was in a range of 10° to 80° and changed at 0.2° per minute.

FIG. 1 shows a result of XRD diffraction analysis according to Example 1 of the present invention having a crystal structure showing a diffraction peak having a relative intensity of 5% or more in a range of Bragg angles (2θ) of an x-ray diffraction pattern of 14.7° to 15.7°, 22.1° to 23.1°, 25.5° to 26.5°, and 29.7° to 30.8°, which is specified in the claims of the present application.

As shown in FIGS. 2 to 4, Example 2 to Example 37 of the present invention also have a crystal structure showing a diffraction peak having a relative intensity of 5% or more in a range of Bragg angles (2θ) of 14.7° to 15.7°, 22.1° to 23.1°, 25.5° to 26.5°, and 29.7° to 30.8°, as in Example 1.

Evaluation of Battery Characteristics

Battery characteristics were evaluated using the coin cells manufactured as described above, and the results are shown in FIGS. 5 to 18, and the numbers shown in FIGS. 4 to 18 indicate the order of Examples.

Conditions for evaluating the battery characteristics were C-rate: 12 mA/g and Cutoff: 2.0 V to 5.4 V.

Table 1 below shows capacities of a $1^{st}$ cycle and a $10^{th}$ cycle of the coin cells using the positive electrodes manufactured according to Examples 1 to 37.

TABLE 1

| Examples | 1$^{st}$ cycle Capacity (mAh/g) | | 10$^{th}$ cycle Capacity (mAh/g) | |
|---|---|---|---|---|
| | Charge | Discharge | Charge | Discharge |
| 1 | 117.5479 | 51.2634 | 65.8395 | 50.4012 |
| 2 | 78.4740 | 32.3062 | 45.0536 | 37.0842 |
| 3 | 89.4762 | 21.3546 | 46.4025 | 28.9539 |
| 4 | 56.5535 | 19.7825 | 32.3475 | 26.3301 |
| 5 | 56.5535 | 19.7825 | 32.3475 | 26.3301 |
| 6 | 69.7685 | 20.6473 | 32.2046 | 24.2256 |
| 7 | 174.3166 | 29.2949 | 50.7070 | 32.6744 |
| 8 | 270.5535 | 45.6793 | 49.9893 | 35.2444 |
| 9 | 253.4519 | 26.4667 | 36.9736 | 22.7879 |
| 10 | 68.4465 | 20.1204 | 31.3705 | 24.0434 |
| 11 | 187.1293 | 47.4293 | 49.6825 | 33.4117 |
| 12 | 36.7565 | 7.5408 | 10.6169 | 8.5019 |
| 13 | 36.7565 | 7.5408 | 10.6169 | 8.5019 |
| 14 | 286.0406 | 38.9994 | 37.7916 | 31.3147 |
| 15 | 182.0785 | 14.6451 | 24.1489 | 12.7888 |
| 16 | 242.3889 | 16.4903 | 79.7147 | 34.9506 |
| 17 | 117.0702 | 17.5034 | 26.0003 | 16.1618 |
| 18 | 242.2863 | 13.0562 | 35.6631 | 25.7841 |
| 19 | 329.7233 | 24.8532 | 34.0221 | 17.0443 |
| 20 | 631.0279 | 34.4352 | 56.9538 | 29.7499 |
| 21 | 21.9084 | 5.3025 | 12.8840 | 9.1126 |
| 22 | 754.5139 | 31.6436 | 37.7865 | 21.5670 |
| 23 | 257.4543 | 31.9925 | 41.2541 | 25.0494 |
| 24 | 711.8794 | 42.0565 | 80.6237 | 41.9073 |
| 25 | 1044.5680 | 53.9011 | 75.4187 | 41.9463 |
| 26 | 864.5000 | 55.2004 | 63.4230 | 35.6992 |
| 27 | 411.7310 | 18.1105 | 32.4082 | 16.6592 |
| 28 | 221.5977 | 34.1472 | 31.7954 | 20.1695 |
| 29 | 599.0928 | 24.7310 | 35.4204 | 19.8390 |
| 30 | 127.3513 | 66.2378 | 67.9234 | 64.9929 |
| 31 | 87.2183 | 47.7411 | 47.1652 | 44.3857 |
| 32 | 100.9744 | 53.3868 | 59.5881 | 55.4505 |
| 33 | 112.6637 | 59.8933 | 66.7075 | 58.2496 |
| 34 | 109.7573 | 41.9130 | 40.8234 | 37.3324 |
| 35 | 53.2168 | 16.8569 | 28.5120 | 23.7850 |
| 36 | 100.8606 | 44.7452 | 42.9312 | 39.5275 |
| 37 | 95.5956 | 35.9387 | 38.4399 | 34.1995 |

As shown in Table 1, it was confirmed that the positive electrodes manufactured according to Examples 1 to 37 of the present invention function as a secondary battery.

Particularly, in Example 1, Example 30, Example 31, Example 32, and Example 33, since the discharge capacity at the first cycle was more than 50 mAh/g and a rate of decrease in the discharge capacity at the $10^{th}$ cycle was low, it is expected that a discharge capacity retention rate is excellent.

Modes of the Invention

The positive electrode active material was synthesized by a solid phase method. As synthesized materials, $KTiP_2O_7$, $KMoP_2O_7$, $KCo(PO_3)_3$, $KNi(PO_3)_3$, $KCrP_2O_7$, $KFeP_2O_7$, $K_2(VO_3)(P_2O_7)_2$, $K_2MnP_2O_7$, and $KMnVO_4$ were synthesized together with $KVP_2O_7$ as in Examples of the present invention to confirm the possibility of a positive electrode active material for a potassium secondary battery.

Here, $K_2CO_3$ was used as a potassium precursor, and $H_2(NH_4)PO_4$ or $H(NH_4)_2PO_4$ was used as a phosphorus (P) precursor. Various transition metal oxides or carbonates ($TiO_2$, $V_2O_5$, $Fe_2O_3$, $Cr_2O_3$, $MoO_2$, $Co_3O_4$, NiO, $MnCO_3$, and MnO) have been used as a precursor of the metal element in each compound.

Specifically, a starting material was prepared according to the above chemical composition, and the starting material was pulverized and mixed, and sintered at a temperature suitable for each material. Sintering was performed at 800° C. under a reducing atmosphere (argon or 15% $H_2/N_2$), at 700° C. for $KCo(PO_3)_3$, 600° C. for $KNi(PO_3)_3$, and at 1050° C. for $KCrP_2O_7$.

Further, a potassium half-cell was manufactured to evaluate the performance of the manufactured positive electrode active material for a potassium secondary battery. In order to manufacture the potassium half-cell, the positive electrode active material powder synthesized as described above, acetylene black as a conductive material, and polyvinylidene fluoride (PVDF) as a binder were mixed at a weight ratio of 65:20:15, and N-methyl pyrrolidone (NMP) as a solvent was added thereto, followed by mixing and stirring to manufacture a positive electrode slurry. The slurry was applied to aluminum foil as a current collector, and then dried in an oven at 120° C. for at least 8 hours to prepare a positive electrode. Further, potassium foil was used as a negative electrode and a reference electrode.

A separator made of a porous polyethylene membrane was disposed between the positive electrode and the negative electrode manufactured as described above, and then an electrolyte (0.5M KPF6/ethylene carbonate (EC):diethyl carbonate (DEC)) was injected thereinto to manufacture a coin cell.

Cyclic Voltammetry (CV) Test

FIG. 19 shows a CV measurement result of the materials synthesized through the above-described processes, and whether the colors of the materials have changed during the measurement process.

FIG. 19 shows redox potentials and peak currents which are clearly distinguished according to the structure and composition of the synthesized materials.

In particular, only $KTiP_2O_7$, $KVP_2O_7$, and $KMoP_2O_7$ showed remarkable redox peak pairs among the synthesized materials. Among these, in the case of $K_2(VO)_3(P_2O_7)_2$, $K_2MnP_2O_7$, and $KMnVO_4$, electroactivity was not observed.

Images shown in left and right columns of FIG. 19 show compounds and chemically oxidized powders, respectively. As confirmed in FIG. 19, an initial color of electroinactive compounds was maintained even after oxidation, but the color change was noticeable in the case of $KTiP_2O_7$, $KVP_2O_7$, and $KMoP_2O_7$.

The correlation between such electrical activity and the color change due to oxidation may be seen as that extraction of $K^+$ in the compound involves specific types of structural relaxation and consequently changes in optical characteristics.

However, considering the limited theoretical capacity of pyrophosphate, a high redox potential is required to obtain a high energy density, but as confirmed in FIG. 1, $KTiP_2O_7$ and $KMoP_2O_7$ have a problem in that the redox potential is too low.

FIG. 20 shows constant current charge and discharge results for $KTiP_2O_7$, $KVP_2O_7$, and $KMoP_2O_7$. As confirmed in FIGS. 20A ($KTiP_2O_7$) and 20B ($KMoP_2O_7$), these two materials exhibited a very low discharge capacity.

In contrast, as confirmed in FIGS. 20C and 20D, the positive electrode active material according to Examples ($KVP_2O_7$) of the present invention exhibited an improved discharge capacity as compared with the two materials.

Shape and Component Analysis

FIG. 21 shows results of examining shapes and compositions of $KVP_2O_7$ and $K_{1-x}VP_2O_7$-chemically oxidized $KVP_2O_7$ with $NO_2BF_4$ using field emission scanning electron microscopy (FESEM) and energy dispersive X-ray spectroscopy (EDX).

The synthesized $KVP_2O_7$ powder had a shape which did not grow in a specific direction, and a particle size thereof was in a range of 1 um to 3 um. As confirmed in FIG. 21, such a shape was retained even after performing chemical oxidation by $NO_2BF_4$.

Further, in an EDX elemental analysis, synthesized $KVP_2O_7$ particles were analyzed with $K_{0.96}VP_{1.9}O_7$, and a composition of chemically oxidized $K_{1-x}VP_2O_7$ was analyzed with $K_{0.39}VP_{1.7}O_7$. Considering the uncertainty of quantification, the compositions of the synthesized and chemically oxidized materials may be seen as $KVP_2O_7$ and $K_{0.4}VP_2O_7$, respectively. The fact that it is possible to generate $K_{0.4}VP_2O_7$ means that $KVP_2O_7$ may achieve high capacity.

Structural Analysis

FIG. 22 shows X-ray diffraction (XRD) analysis results for $KVP_2O_7$ and $K_{0.4}VP_2O_7$.

As confirmed in FIG. 22, a crystal structure of $K_{0.4}VP_2O_7$ was completely different from a crystal structure of $KVP_2O_7$. Electronic conductivity measured by a two-point probe method is also changed such that the electronic conductivity of $10^{-9}$S/cm of $KVP_2O_7$ rapidly changes to about $10^{-5}$S/cm through the phase transition, which may be advantageous for fast discharge. On the other hand, the crystal structure of $K_{0.4}VP_2O_7$ was not stable at high temperature.

FIG. 22C shows a result of heat treatment of $K_{0.4}VP_2O_7$ at 800° C. under 5% $H_2/N_2$, and as shown in FIG. 22C, the pattern and color were recovered to be the same as those of the initial $KVP_2O_7$. Accordingly, the $K_{0.4}VP_2O_7$ phase is likely to be a metastable phase in which local energy is minimally stabilized.

Phase analysis of the $K_{0.4}VP_2O_7$ phase through a powder XRD-based structural analysis process revealed that the $K_{0.4}VP_2O_7$ phase was a triclinic phase (space group P-1), which is quite different from $KVP_2O_7$ that is a monoclinic phase (space group $P2_1/c$).

FIG. 23 shows the difference in forms of $PO_4$ tetrahedra of a $K_{0.4}VP_2O_7$ phase and a $KVP_2O_7$ phase when projected along the P1-P2 bonding.

FIG. 24 shows results of examining a structural change of the positive electrode active material through synchrotron in-situ XRD analysis during charging and discharging processes. As confirmed in FIG. 24, a phase transition from $P2_1/c$ to P-1 occurred during discharging, and a recovery to $P2_1/c$ occurred during charging. That is, a reversible phase transition occurred during electrochemical charge and discharge.

However, the phase transition from $P2_1/c$ to P-1 did not occur completely at the electrochemical charging of 20° C. unlike chemical oxidation, which is consistent with the result of a relatively low reversible capacity at 20° C. (see FIG. 20).

Accordingly, it may be seen that the complete phase transition from $P2_1/c$ to P-1 is a factor that greatly influences an improvement of electrochemical characteristics of the positive electrode active material.

Evaluation of Battery Characteristics

Battery characteristics were evaluated using the coin cells manufactured as described above, and the results are shown in FIG. 25.

FIG. 25A shows changes in the first charge and discharge profile when the current density was increased from 0.25 C to 10 C at 50° C. As confirmed in FIG. 25A, a maximum discharge capacity of 60 mAh/g was obtained at 0.25 C, and the electrochemical charge and discharge results indicate that $0.6K^+$ may be reversibly deintercalated/intercalated as in the above-described chemical oxidation.

Meanwhile, the increase of the current density induces an increase of an overvoltage, thereby restricting the high potential redox reaction to lower the discharge capacity. The high potential discharge capacity was continuously decreased according to the current density and reached a reversible capacity of 37 mAh/g at 10.0 C.

However, in spite of the decrease in the discharge capacity and the mean discharge potential according to the increase of the current density, a very excellent energy density of 253 Wh/kg is exhibited at an output density of 105 W/kg as shown in FIG. 25B, and the energy density tends to gradually decrease to 188 Wh/kg at an output density of 1625 W/kg.

Such a result shows that the energy density reaches 75% of the highest value despite the remarkably increased charge/discharge rate, which may be regarded as showing excellent rate performance Evolution of the diffusion coefficient Ds with discharge depth were examined using a galvanostatic intermittent titration technique (GITT) and the results are shown in FIG. 25C.

At a high potential plateau of 4.57 V, Ds are relatively low (about 2 to $4\times10^{-11} CM^2/s$), but a sharp increase in Ds occurs at a potential gradient of about 4.45 V. In addition, after the low potential discharge at 4.23 V, Ds tend to suddenly decrease and then steadily increase.

Despite these variations in Ds, a mean D value was about $3\times10^{-11}$ cm$^2$/s at 50, which was not so low that the transport of large size $K^+$ of $KVP_2O_7$ was not significantly hindered. This value was somewhat higher compared to $LiFePO_4$ ($10^{-14}$~$10^{-15}$ cm$^2$/s) and $LiMn_2O_4$ ($10^{-11}$~$10^{-9}$ cm$^2$/s). The rapid $IC^+$ diffusivity of $KVP_2O_7$ according to Examples of the present invention appears to be a major factor in maintaining high energy density during fast charge and discharge in $KVP_2O_7$.

Further, as shown in FIG. 25D, $KVP_2P_7$ exhibited excellent cycle characteristics due to the strong $P_2O_7$ network. During the initial 20 charge/discharge cycles, the initial capacity of 60 mAh/g was reduced to 51 mAh/g, but the next 80 charge/discharge cycles showed a negligible reduction in capacity.

This research was supported by Creative Materials Discovery Program through the National Research Foundation of Korea (NRF) funded by Ministry of Science and ICT (Project No.: 20150899, Project name: Discovery of inorganic functional materials using heuristics-based computation)

The invention claimed is:

1. A positive electrode active material for a potassium secondary battery, which is a crystalline material comprising K, a transition metal, P, and O, the material comprising:

as a main phase, a phase showing a diffraction peak having a relative intensity of 5% or more in a range of Bragg angles (2θ) of an X-ray diffraction pattern of 14.7° to 15.7°, 22.1° to 23.1°, 25.5° to 26.5°, and 29.7° to 30.8° when a relative intensity of a diffraction peak having the strongest intensity is taken as 100% in the powder X-ray diffraction pattern of the material, wherein the crystalline material has a composition of Formula 1,

[Formula 1]

$(K_{1-a}M1_a)(M2_{1-b}M3_b)P_cO_d$ wherein, M1 is one or more among alkali metal elements other than K, M2 and M3 are one or more among transition metal elements, and $0 \leq a \leq 0.2$, $0 \leq b \leq 0.7$, $1.8 \leq c \leq 2.2$, and $6.8 \leq d \leq 7.2$, and wherein the crystalline material includes one or more selected from Li, Na, Rb, Al, La, Gd, and Lu.

2. The positive electrode active material of claim 1, wherein the transition metal includes one or more selected from V, Ti, Fe, Cr, Mo, Mn, Co, and Ni.

3. The positive electrode active material of claim 1, wherein in the crystalline material, a phase transition to a monoclinic crystal structure and a triclinic crystal structure is dynamically performed in a charge and discharge process.

4. The positive electrode active material of claim 1, wherein the crystalline material has a monoclinic crystal structure in a charged state and a triclinic crystal structure in a discharged state.

5. The positive electrode active material of claim 1, wherein the crystalline material has a space group $P2_1/c$ in a charged state and a space group P-1 in a discharged state.

6. A potassium secondary battery comprising:
a positive electrode;
a negative electrode; and
an electrolyte, wherein the positive electrode includes a positive electrode active material including: K; a transition metal; P; and O, and the positive electrode active material includes, as a main phase, a phase showing a diffraction peak having a relative intensity of 5% or more in a range of Bragg angles (2θ) of an X-ray diffraction pattern of 14.7° to 15.7°, 22.1° to 23.1°, 25.5° to 26.5°, and 29.7° to 30.8° when a relative intensity of a diffraction peak having the strongest intensity is taken as 100% in the powder X-ray diffraction pattern, wherein the crystalline material has a composition of Formula 1,

[Formula 1]

$(K_{1-a}M1_a)(M2_{1-b}M3_b)P_cO_d$ wherein, M1 is one or more among alkali metal elements other than K, M2 and M3 are one or more among transition metal elements, and $0 \leq a \leq 0.2$, $0 \leq b \leq 0.7$, $1.8 \leq c \leq 2.2$, and $6.8 \leq d \leq 7.2$, and wherein the crystalline material includes one or more selected from Li, Na, Rb, Al, La, Gd, and Lu.

7. The potassium secondary battery of claim 6, wherein the transition metal includes one or more selected from V, Ti, Fe, Cr, Mo, Mn, Co, and Ni.

8. The potassium secondary battery of claim 6, wherein the main phase includes a crystalline material in which a phase transition to a monoclinic crystal structure and a triclinic crystal structure is dynamically performed in a charge and discharge process.

9. The potassium secondary battery of claim 8, wherein the crystalline material has the monoclinic crystal structure in a charged state and the triclinic crystal structure in a discharged state.

10. The potassium secondary battery of claim 8, wherein the crystalline material has a space group $P2_1/c$ in a charged state and a space group P-1 in a discharged state.

* * * * *